(12) United States Patent
Isherwood et al.

(10) Patent No.: US 6,691,914 B2
(45) Date of Patent: Feb. 17, 2004

(54) METHOD AND SYSTEM FOR DIRECTING END USER TO NETWORK LOCATION OF PROVIDER BASED ON USER-PROVIDED CODES

(75) Inventors: David Isherwood, Staten Island, NY (US); John Lommock, Hatboro, PA (US); Kaj Nygren, Stockholm (SE); Peter Ritz, Meadowbrook, PA (US)

(73) Assignee: AirClic, Inc., Newtown, PA (US)

( * ) Notice: Subject to any disclaimer, the term of this patent is extended or adjusted under 35 U.S.C. 154(b) by 99 days.

(21) Appl. No.: 09/971,369

(22) Filed: Oct. 4, 2001

(65) Prior Publication Data

US 2002/0030097 A1 Mar. 14, 2002

Related U.S. Application Data

(63) Continuation-in-part of application No. 09/951,361, filed on Sep. 13, 2001, which is a continuation-in-part of application No. 09/310,355, filed on May 12, 1999, which is a continuation-in-part of application No. 09/236,176, filed on Jan. 25, 1999.
(60) Provisional application No. 60/252,906, filed on Nov. 27, 2000.

(51) Int. Cl.[7] ............................................... G06F 17/00
(52) U.S. Cl. ....................... 235/375; 235/376; 709/219; 705/26
(58) Field of Search ................................. 345/326, 741; 705/27, 26; 709/219; 235/375, 462.13, 462.15

(56) References Cited

U.S. PATENT DOCUMENTS

| | | | |
|---|---|---|---|
| 4,042,113 A | 8/1977 | Duncan et al. | |
| 4,752,675 A | 6/1988 | Zetmeir | |
| 4,797,818 A | 1/1989 | Cotter | |
| 4,964,043 A | 10/1990 | Galvin | |
| 5,122,959 A | 6/1992 | Nathanson et al. | |
| 5,434,394 A | 7/1995 | Roach et al. | |
| 5,444,444 A | 8/1995 | Ross | |

(List continued on next page.)

FOREIGN PATENT DOCUMENTS

| | | |
|---|---|---|
| EP | 856812 A2 | 8/1998 |
| EP | 856812 A3 | 5/1999 |
| WO | WO 95/26536 A | 10/1995 |
| WO | WO 97/01137 | 9/1997 |
| WO | WO9917230 | 4/1999 |

OTHER PUBLICATIONS www.dallasnews.com; "The Dallas Morning News Internet–Enhanced", pp. 1–7.
www.getcuecat.com; "Welcome Parade Readers"; Digital Convergence, p. 1.
www.forbes.com; "The Cue Cat", pp. 1–2.
Bango.Net, www.bango.net, 71 pages.
Internet Number, www.hatch.co.jp/e, 34 pages.

Primary Examiner—Michael G. Lee
Assistant Examiner—Daniel Walsh
(74) Attorney, Agent, or Firm—Morgan, Lewis & Bockius, LLP

(57) ABSTRACT

Information representative of scanned machine-readable codes is transmitted between network sites. Information associated with scans of machine-readable codes are received at a first site and stored within a database, along with a unique alpha-numeric identifier. The end user is directed from the first site to a second site with a URL that includes a symbol identifying an address of the second site on the network and the unique alpha-numeric identifier. A request (which includes a representation of the unique alpha-numeric identifier) for the information stored at the first site is received. The information stored at the first site is sent to the second site.

2 Claims, 36 Drawing Sheets

U.S. PATENT DOCUMENTS

| | | | |
|---|---|---|---|
| 5,478,989 | A | 12/1995 | Shepley |
| 5,496,071 | A | 3/1996 | Walsh |
| 5,583,487 | A | 12/1996 | Ackerman et al. |
| 5,583,994 | A | 12/1996 | Rangan |
| 5,624,265 | A | 4/1997 | Redford et al. |
| 5,625,776 | A | 4/1997 | Johnson |
| 5,630,125 | A | 5/1997 | Zellweger |
| 5,640,193 | A | 6/1997 | Wellner |
| 5,657,222 | A | 8/1997 | Randolph |
| 5,664,110 | A | 9/1997 | Green et al. |
| 5,694,551 | A | 12/1997 | Doyle et al. |
| 5,715,314 | A | 2/1998 | Payne |
| 5,761,499 | A | 6/1998 | Sonderegger |
| 5,804,803 | A | 9/1998 | Cragun et al. |
| 5,825,002 | A | 10/1998 | Roslak |
| 5,832,457 | A | 11/1998 | O'Brien et al. |
| 5,848,413 | A | 12/1998 | Wolff |
| 5,869,819 | A | 2/1999 | Knowles et al. |
| 5,890,136 | A | 3/1999 | Kipp |
| 5,893,910 | A | 4/1999 | Martineau et al. |
| 5,899,700 | A | 5/1999 | Williams et al. |
| 5,905,248 | A | 5/1999 | Russell et al. |
| 5,905,251 | A | 5/1999 | Knowles |
| 5,907,836 | A | 5/1999 | Sumita et al. |
| 5,918,211 | A | 6/1999 | Sloan |
| 5,933,829 | A | 8/1999 | Durst et al. |
| 5,938,727 | A | 8/1999 | Ikeda |
| 5,940,074 | A | 8/1999 | Britt, Jr. et al. |
| 5,950,173 | A | 9/1999 | Perkowski |
| 5,956,483 | A | 9/1999 | Grate et al. |
| 5,957,695 | A | 9/1999 | Redford et al. |
| 5,963,916 | A | 10/1999 | Kaplan |
| 5,970,469 | A | 10/1999 | Scroggie et al. |
| 5,974,222 | A | 10/1999 | Yuen et al. |
| 5,978,773 | A * | 11/1999 | Hudetz et al. ................ 705/23 |
| 5,979,757 | A | 11/1999 | Tracey et al. |
| 5,983,199 | A | 11/1999 | Kaneko |
| 5,987,440 | A | 11/1999 | O'Neil et al. |
| 5,992,752 | A | 11/1999 | Wilz, Sr. et al. |
| 5,995,105 | A | 11/1999 | Reber et al. |
| 6,006,242 | A | 12/1999 | Poole et al. |
| 6,006,252 | A | 12/1999 | Wolfe |
| 6,011,949 | A | 1/2000 | Shimomukai |
| 6,012,102 | A | 1/2000 | Shachar |
| 6,026,375 | A | 2/2000 | Hall et al. |
| 6,027,024 | A | 2/2000 | Knowles |
| 6,029,141 | A | 2/2000 | Bezos et al. |
| 6,031,621 | A | 2/2000 | Binder |
| 6,032,130 | A | 2/2000 | Alloul et al. |
| 6,032,195 | A | 2/2000 | Reber et al. |
| 6,034,680 | A | 3/2000 | Kessenich et al. |
| 6,038,552 | A | 3/2000 | Fleischl et al. |
| 6,045,048 | A | 4/2000 | Wilz, Sr. et al. |
| 6,049,835 | A | 4/2000 | Gagnon |
| 6,064,979 | A | 5/2000 | Perkowski |
| 6,101,483 | A | 8/2000 | Petrovich et al. |
| 6,123,259 | A | 9/2000 | Ogasawara |
| 6,134,548 | A | 10/2000 | Gottsman et al. |
| 6,137,950 | A | 10/2000 | Yuen |
| 6,144,848 | A | 11/2000 | Walsh et al. |
| 6,148,331 | A * | 11/2000 | Parry ......................... 709/218 |
| 6,154,738 | A | 11/2000 | Call |
| 6,199,048 | B1 | 3/2001 | Hudetz et al. |
| 6,246,997 | B1 | 6/2001 | Cybul et al. |
| 6,542,933 | B1 | 4/2003 | Durst, Jr. et al. |
| 2001/0011233 | A1 | 8/2001 | Narayanaswami |
| 2001/0013011 | A1 | 8/2001 | Day et al. |
| 2001/0014868 | A1 | 8/2001 | Herz et al. |

* cited by examiner

| Scans & Folders | My Services | What's New | My Account |

Folder Name

Launch With Service　　　　　Move to folder
[Choose... ▽] [+]　　　　　[Choose... ▽] [+]

Title
Date scanned: [month day,year] [HH:MM A/PM] [Time Zone]
Scan type: [Scan #]
Owner/Manufacturer: [Owner/Manufacturer]

Short description

Long Description - Lorem ipsum dolor sit amet consectetuer adipiscing elit, sed diam nonummy nibh euismed tincidunt ut laoreet Notes-

[                    ◁ ▷ ] ← 2130

[SAVE NOTES]　　　　　　　[REMOVE] [SEND TO FRIEND]

Scans & Folders
Latest Scans
>Folder Example
Folder Example
Deleted Scans
[EDIT FOLDERS]

Buddy List
[EDIT LIST]

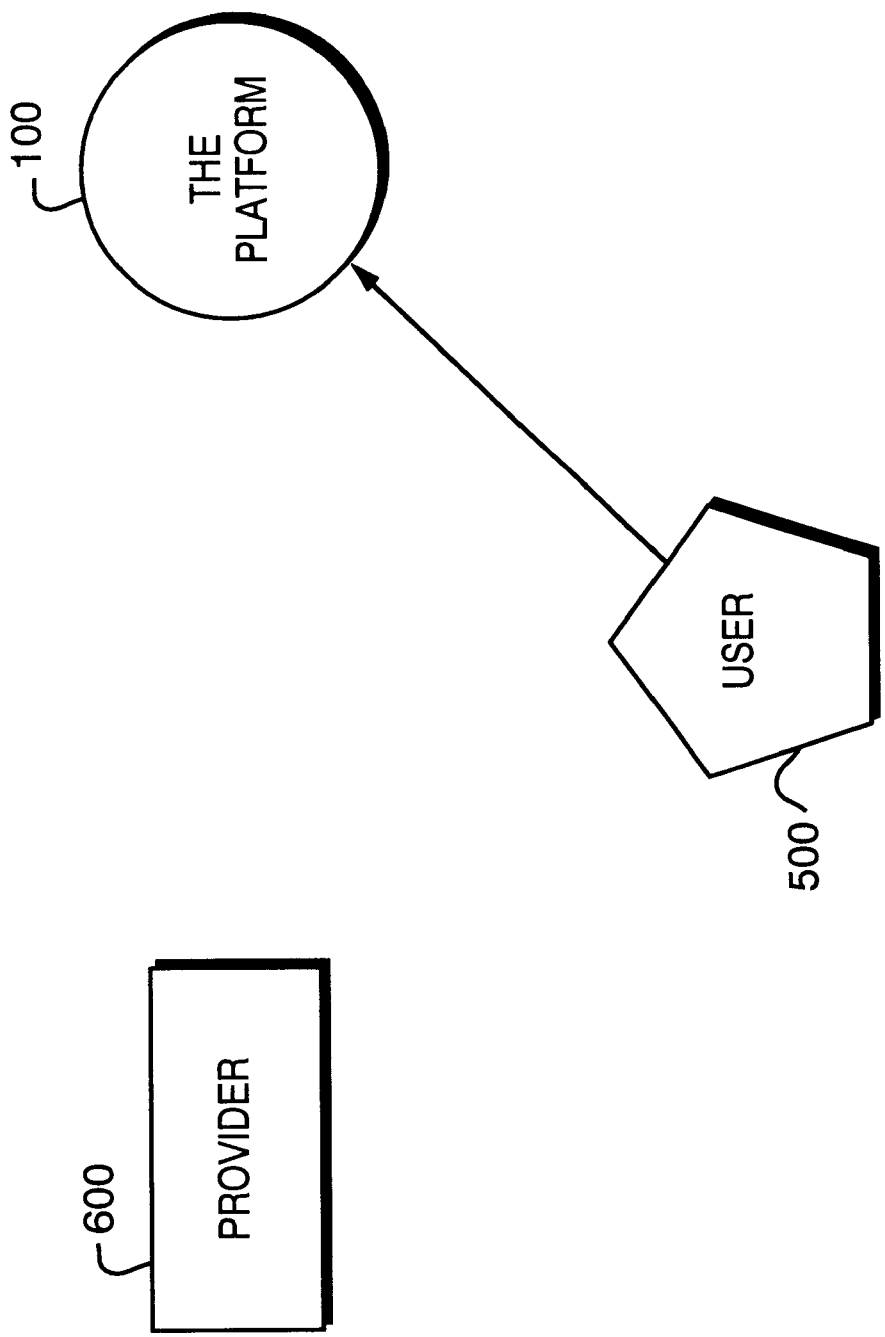

US 6,691,914 B2

METHOD AND SYSTEM FOR DIRECTING END USER TO NETWORK LOCATION OF PROVIDER BASED ON USER-PROVIDED CODES

This application claims priority to U.S. Provisional Application No. 60/252,906 filed Nov. 27, 2000 and is a continuation-in-part of U.S. patent application Ser. No. 09/236,176 filed Jan. 25, 1999, Ser. No. 09/310,355 filed May 12, 1999, and Ser. No. 09/951,361 filed Sep. 13, 2001.

FIELD OF THE INVENTION

The present invention relates to directing an end user to a network address of a provider based on codes provided by the user.

BACKGROUND OF THE INVENTION

Bar code scanning technology has been in use for quite some time. Such bar codes appear on most items encountered by consumers every day—from grocery items to driver's licenses. Other types of codes (such as private codes), and methods for acquiring such codes, have been and are continuing to be developed. Bar codes and other codes allow for fast and easy identification, tracking, and inventory of items as well as storage of data relating to such items. As bar codes have become a common and familiar part of the consumer experience, so has the use of web services and applications. Different types of web services and applications continue to grow in number and popularity.

Identifying ways of converging these two apparently disparate technologies to create a product that provides mobility, simplicity, accuracy, convenience and efficiency to web applications and services would enable companies to reduce costs (by replacing formerly manual tasks with bar coding technology), increase revenue (by offering barcode-enabled advertising alternatives that allow consumers to learn about products, prices, store locations etc.), increase productivity (by automating sales force tasks such as product ordering), and improve customer loyalty (by offering barcode related value-added services to customers).

SUMMARY OF THE INVENTION

The present invention provides systems and methods related to the convergence of bar code and other coding technologies and web-based applications and services, thereby fulfilling a need present in the prior art.

In particular, the present invention is directed to a method and system for transmitting information representative of scanned machine-readable codes between network sites. Information associated with one or more scans of machine-readable codes made by an end-user is received at a first site. The information associated with the scans of machine-readable codes is stored in a database associated with the first site within a data record having a unique alpha-numeric identifier associated therewith. The end-user is directed from the first site to a second site with a URL that includes both a symbol identifying an address of the second site on the network and the unique alpha-numeric identifier associated with the information stored at the first site. A request signal is received at the first site from the second site for the information stored at the first site. The request signal includes a representation of the unique alpha-numeric identifier. The stored information is sent from the first site to the second site in response to the request signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings:

FIGS. 4A and 4B illustrate exemplary user interfaces that may be employed by an end user in accordance with a preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1A:
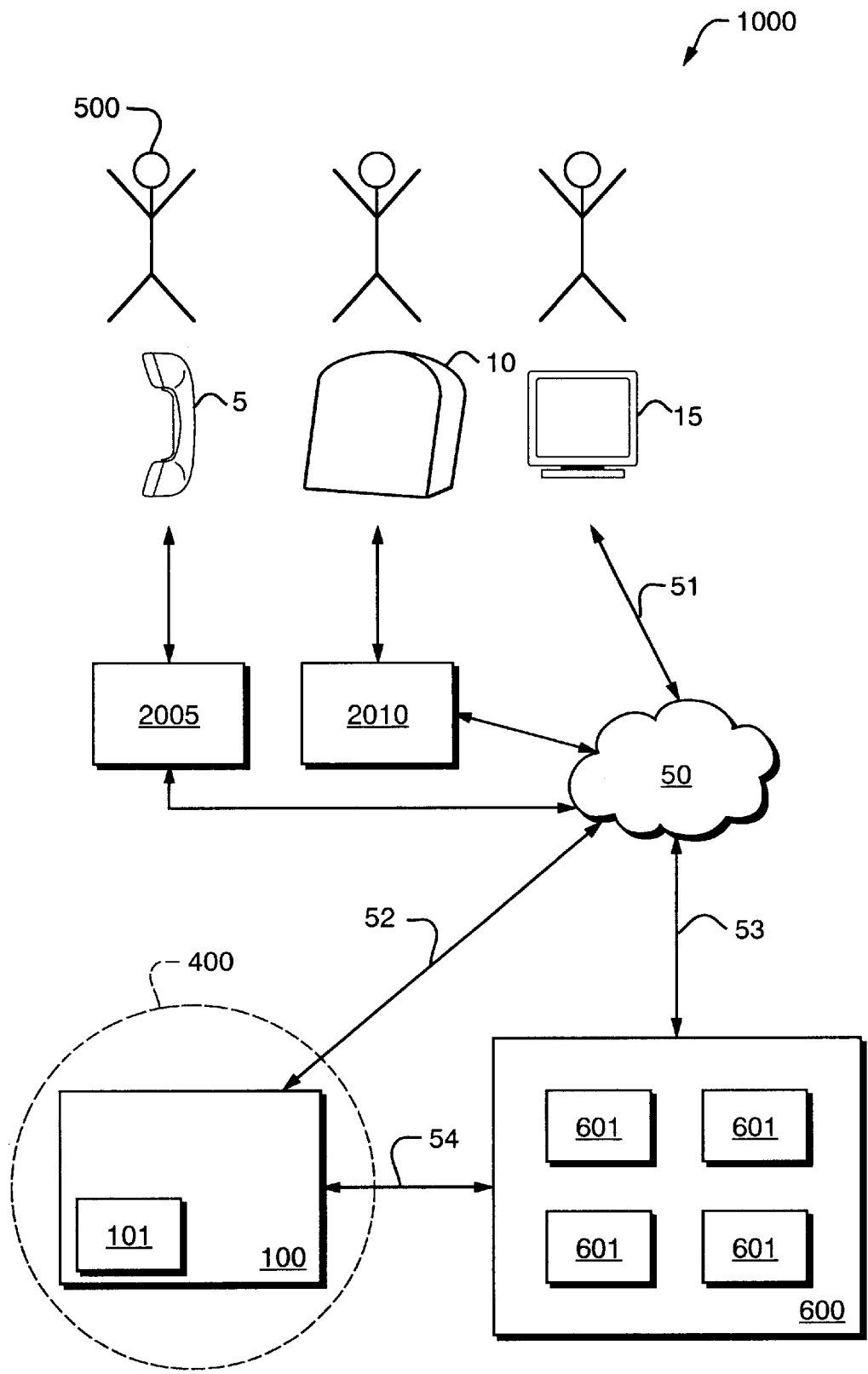
FIG. 1A illustrates a preferred embodiment of a system for carrying out the methods of the present invention.

FIG. 1A illustrates a preferred embodiment of a system 1000 for carrying out the methods of the present invention. System 1000 includes a plurality of end users 500, each with a device that allows the end user 500 to scan or otherwise input codes (i.e., numbers) that are associated with an expressed goal of the end user 500. System 1000 also includes platform 100 and a plurality of providers 600. Platform 100 comprises multiple components (described more fully with reference to FIG. 2A) that facilitate the interoperability between end users 500 (and their associated devices) and services provided by providers 600. Platform 100 has a wide range of functionality, as described in more detail herein, but primarily functions as a switch, identifying code information, user context and application information necessary for launching services that assist end user 500 in achieving the expressed goal. Platform 100 includes a hub site 101 accessible via the Internet 50, which allows end users 500 and providers 600 to interact with platform 100.

End users 500 may use a variety of different types of devices or acquisition technologies to obtain codes and communicate such codes to platform 100 or providers 600. For example, end users 500 may contact platform 100 by telephone 5 and input the codes by dialing or may speak the codes into the handset. This input is transmitted though voice gateway 2005 to Internet 50 and then to a voice response unit at platform 100 or at providers 600. End users 500 may also use a personal digital assistant 10 and transmit codes through wireless application protocol gateway 2010, to Internet 50, and then to platform 100 or providers 600. Alternatively, the end users 500 may use a portable wireless scanner, or a scanner tethered to end user client 15 to scan bar codes (e.g., public codes including EAN, UPC and JAN) or private codes. These codes can then be transmitted through the Internet 50 and uploaded to platform 100 by end user 500 using end user client 15. Other means of obtaining code information and transmitting it to platform 100 or providers 600 are known in the art and are within the scope of the present invention. The particular device used by end user 500 dictates the functionality of system 1000 that will be enabled. As discussed in more detail below, the device and its identifier govern aspects of access privileges and available functionality within system 1000.

End users 500, platform 100, and providers 600 may connect to each other through a variety of different types of links to form a network. For example, end users 500 may connect to platform 100 through the Internet 50, directly through link 51 and link 52, or by way of provider 600, though link 51, link 53 and link 54. In other embodiments, alternate configurations of the connections between end users 500, platform 100 and providers 600 are possible, will be known to those skilled in the art and are within the scope of the present invention. In some embodiments, one or more of the links between these various entities is wireless.

Providers 600, which include service providers and access providers, each host a provider site 601 accessible via the Internet 50. Providers 600 are organizations that presume to derive income from selling or making available items, materials or applications that they deem to be of value. Providers 600 provide applications/services that accept codes as inputs and are responsible for identifying codes that work with their application/service. Providers 600 are responsible for registration with and authentication to their community/applications/services.

Figure 1B:
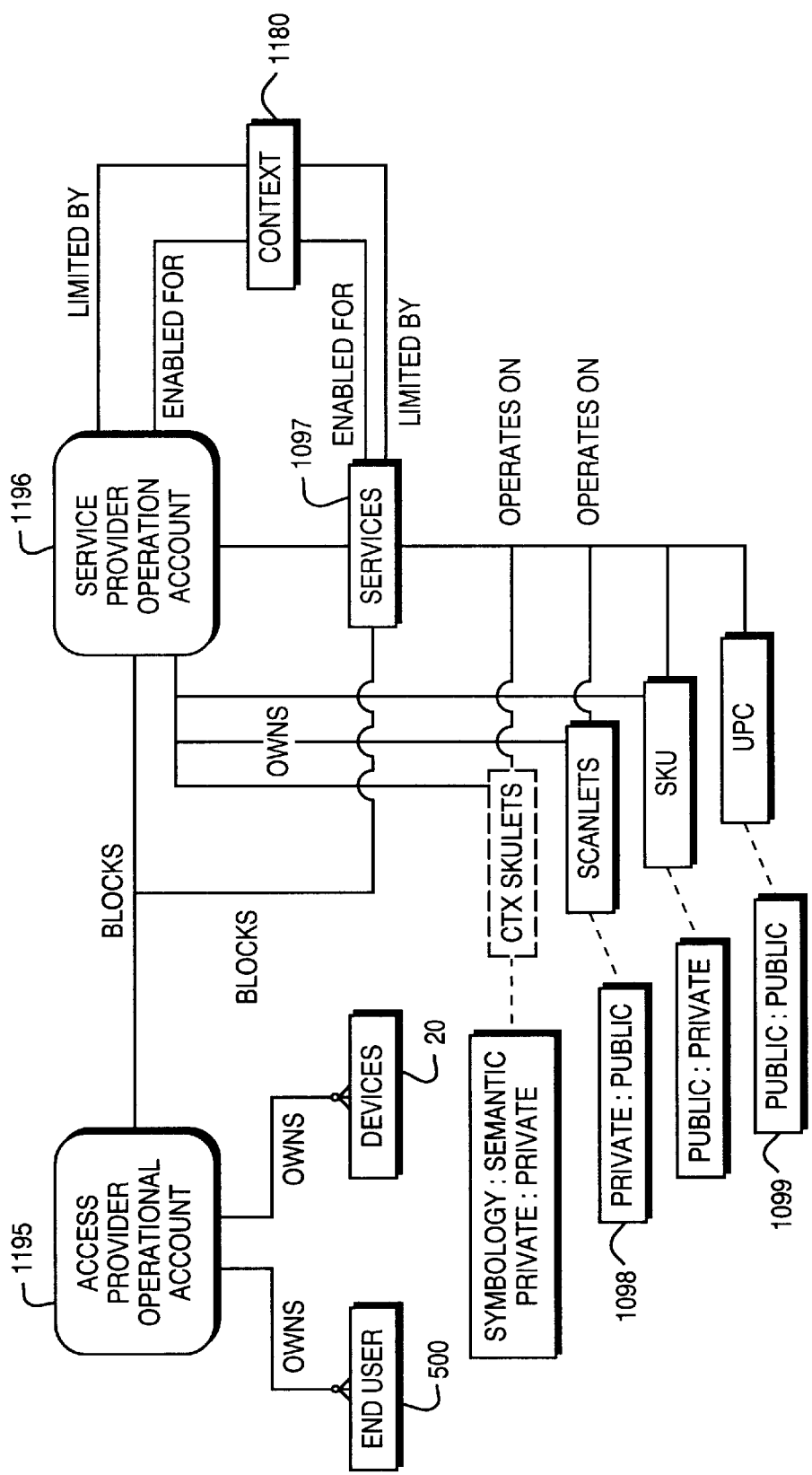
FIG. 1B illustrates a preferred embodiment of a portion of an administrative architecture of the present invention.

The administrative relationship between access providers and services providers can be described with reference to FIG. 1B. An access provider may establish an operational account 1195 within platform 100 (using code catalog component 109 shown in and discussed with reference to FIG. 2A). Similarly, a service provider may establish an operational account 1196 within platform 100. Each end user 500 present on the network within system 1000 is sponsored by at least one access provider. Each access provider "owns" each end user 500 it sponsors in that such access provider has the sole authority to permanently discontinue the access of the end user 500 it sponsors to the network. Similarly, an access provider may supply to end users 500, and thus own, certain devices 20. On the other hand, a service provider may own particular types of private codes 1098 upon which its services 1097 may operate. Its services 1097 may also operate on public codes 1099. Services 1097 of the service provider may be enabled for particular types of contexts 1180, or may be limited by these contexts 1180, as discussed below in more detail with reference to FIG. 2A. In the preferred embodiment, a single organization may serve as both a service provider and an access provider.

At least one interface 400 is disposed between platform 100 and the remainder of system 1000. Access to platform 100 is controlled through interfaces 400. In particular, for example, interfaces 400 monitor and provide security of communications between platform 100 and the remainder of the system 1000, as well as convert data transmitted to and from platform 100. Thus, interfaces 400 are the external boundary of platform 100.

Figure 2A:
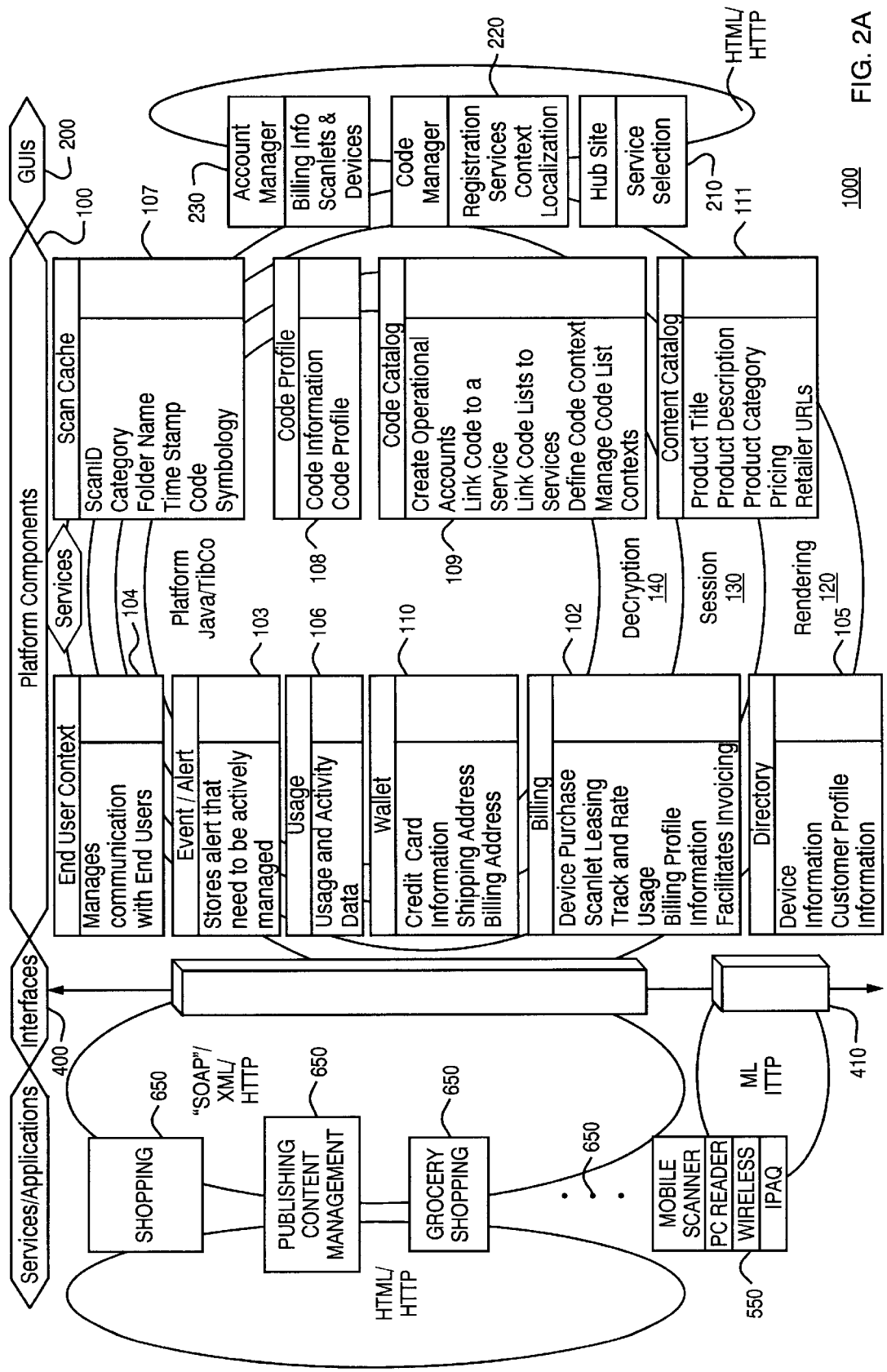
FIG. 2A illustrates a preferred embodiment of a system for carrying out the methods of the present invention.

FIG. 2A illustrates a further preferred embodiment, including more detail, of the system 1000 shown in FIG. 1A. With reference to both FIGS. 1A and 2A, services/applications 650 represent services and applications offered within system 1000 by providers 600 and provide value to end users 500. Exemplary services/applications 650 shown in FIG. 2A include shopping services, including grocery shopping services, and publishing and content management services. However, any type of web service/application 650 could be offered though system 1000 within the scope of the present invention. As described previously with reference to FIG. 2A, end users 500 may employ a variety of devices 550 to communicate information to and receive information from system 1000.

One or more interfaces 400, which provide the means by which providers 600 and end users 500 may access the information and functionality of platform 100, are expressed as SOAP-like envelopes with XML payload using HTTP transport of TCP/IP, in the preferred embodiment. All interface calls to the platform 100, in the preferred embodiment, require credentials and authentication. Also, in cases in which privacy is of concern, encryption may be employed.

Platform 100 performs a number of services that are not identified with any particular component. For example, platform 100 performs a rendering service 120 that enables output of data to end user 500 regardless of the class of device being used by end user 500. This is accomplished by making adjustments to support specific protocols and by making allowances for the physical display geometry and input mechanism of a particular device, through rendering interface 410. Thus, for example, end users 500 will be able to receive output from system 1000 that is appropriate for the particular device being used by end user 500 (i.e., PCs (large devices), web enabled phones (small devices), or PDAs (medium devices)). In the preferred embodiment, service providers are responsible for supplying appropriate output for each class of device in order to take advantage of the rendering services 120 of platform 100.

Session service 130 of platform 100 ensures continued user connection and authentication within a single application sign on. End users 500 using system 1000 navigate across disparate systems owned and run by different organizations and, thus, session service 130 is provided to ensure that the experience of the end user 500 is contiguous. Session service 130 defines the parameters passed from/to external services 650 to/from the platform 100 as an end user 500 passes from one to the other. These parameters may include the following: service identification; the end user identifier (e.g., the GUID described in more detail below); session echo data (i.e., information that the platform 100 has indicated it wants back from the external service 650 when the user returns to the platform 100); external echo data (i.e., information the external service 650 has indicated it wants from the platform 100 when the end user returns to the external service 650); a ticket associated with a list of codes; a time stamp; and a digest that is computed based on the values of the foregoing parameters.

Platform 100 also includes, in the preferred embodiment, decryption service 140. Decryption service 140 allows device-specific decryption of codes and other application data if required. In other embodiments of the present invention, the session, rendering and decryption functions could be carried out by one or more of the providers 600, rather than by platform 100.

In addition to the session, rendering and decryption services performed by platform 100, platform 100 is comprised of a number of different components, in the preferred embodiment. Each component stores particular information and has certain functionality. The functionality supported by the components of platform 100 can be grouped into four main categories, in the preferred embodiment: (1) processing of scans or other code inputs, which includes authenticating codes, devices, and users; uploading, retrieving and encrypting/decrypting codes; and mapping codes to services/applications; (2) managing code lists, which includes adding, removing and editing codes; and copying, cutting, pasting, and clearing lists of codes; (3) administrating codes and associated services/applications, which includes buying and retiring codes; and restricting/gaining access to codes; and (4) monitoring events and usage, which includes monitoring event mechanisms and accessing scan/code input histories for each user and each device.

Providers 600 and end users 500 may access and use the components of platform 100 via a hub site 101, maintained on the Internet by platform 100, using graphical user interfaces ("GUIs") 200. For example, end user GUI 210 is a generic interface through which end users 500 gain access to the information and functionality of platform 100. In some embodiments, the end user GUI 210 may be customized for particular providers 600. In the preferred embodiment, end user context component 104, code profile component 108, event/alert component 103, usage component 106, scan cache component 107 and directory component 105 may be accessed through end user GUI 210.

Code manager GUI 220 can be used by providers 600 to set up and edit services/applications 650; register and issue private codes; create and edit code lists (e.g., a list of codes and their associated data, such as descriptions, used to link the codes to particular URLs of services/applications 650); and assign context to services, such as locale-specific display, display language, and output device channel (e.g., small for mobile phone browser, medium for PDA browser and large for PC browser). Code catalog component 109, directory component 105, and billing component 102 may be accessed by code manager GUI 220, in the preferred embodiment.

Account manager GUI 230 allows for the set up of various business relationships with providers 600. In the preferred embodiment, billing component 102 may be accessed through account manager GUI 230.

The following describes the content and functionality of each component of the platform 100 in a preferred embodiment of the present invention. Additional or less information and/or functionality may be included in the components described below in, other embodiments within the scope of the present invention.

Billing component 102 of platform 100 facilitates invoicing and payment processing. Event/alert component 103 allows for storage of application and business events that should be actively managed to ensure the integrity of data stores and business flows. In particular, this component tracks end user 500 behaviors and provides the mechanism to initiate proactive actions based on the profile of the end user 500. For example, event/alert component 103 may identify potentially fraudulent behavior on behalf of an end-user 500 within system 1000 and proactively intervene. Usage component 106 is used to track usage of system 1000 by end users 500.

End user context component 104 manages communication between platform 100 and end users 500 as well as communication between platform 100 and providers 600. End user context component 104 serves as a container for current activities and associated history representing the dialogue between and among these entities. The information contained in end user context component 104 includes the following general categories of information: marketing information; outstanding issues (e.g., e-mail follow up items); action items (e.g., payments due, certificate lapse); activity log (including feedback to the end user 500 that a fulfillment action has been completed and activities initiated by others with respect to the end user); and activities initiated by the end user 500.

Figure 3:
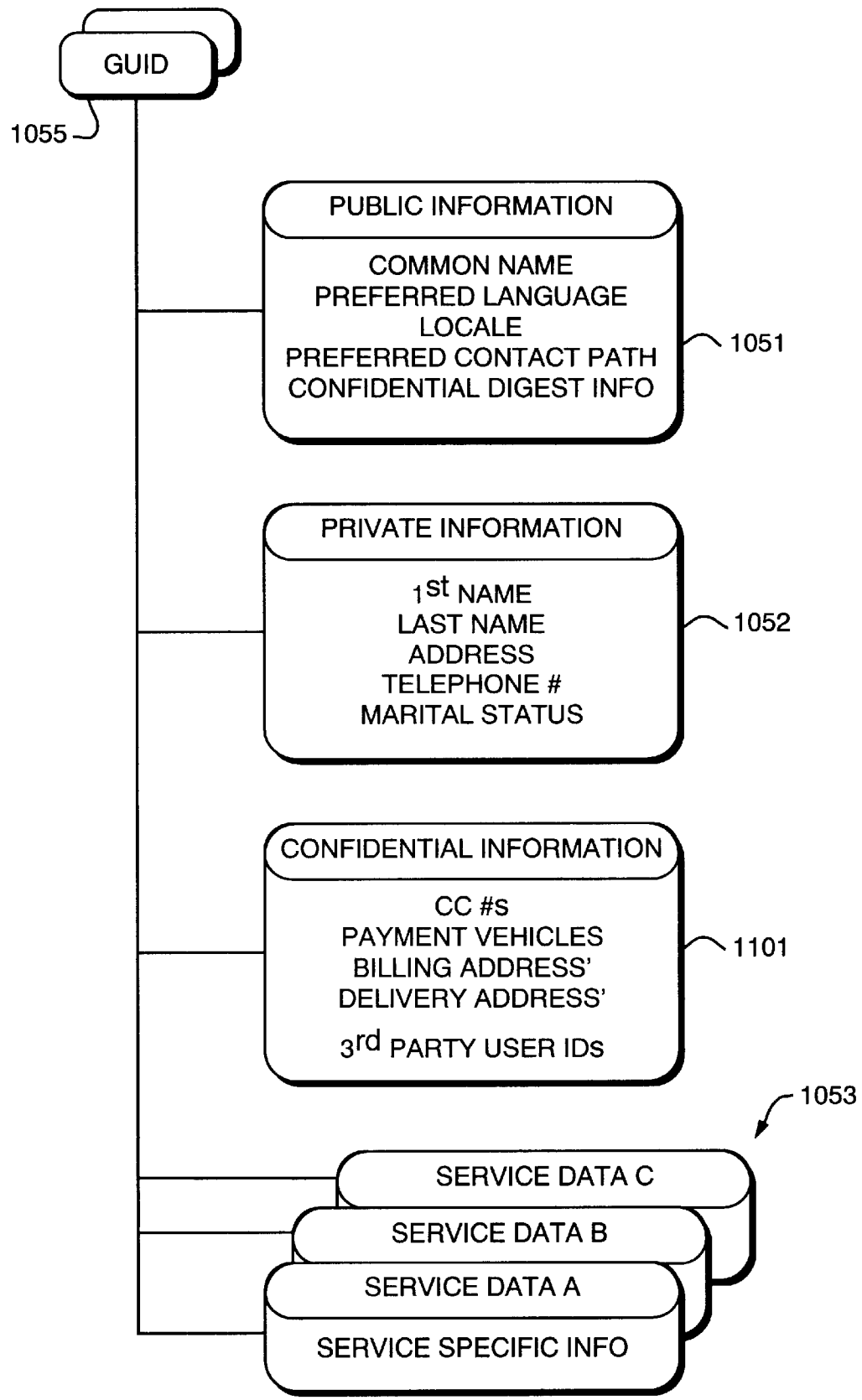
FIG. 3 illustrates a structure for end user profile information associated with an end user identifier that may be used in connection with a preferred embodiment of the present invention.

Directory component 105 contains profile information of end users 500 as well as device information. The device information may include the serial number identification of the device, the device type, device state (active or inactive), and identification of the access provider associated with the device (i.e., the owner). With reference to FIG. 3, the profile information included in directory component 105 comprises various types of end user 500 information that is associated with a non-externally identifying symbol of the end user 500, also referred to herein as a global universally unique identifier ("GUID"). Each end user 500 has at least one GUID 1055 associated with him or her. Some end users have more than one GUID, in some embodiments. There are, in the preferred embodiment, four general categories of information of the end user 500 associated with the GUID 1055. One category of information includes public information 1051 that the end user 500 submits to the hub site 101 and expects will be shared with one or more of the providers 600 without the permission of the end user 500. This public information 1051 may include, for example, the common name of the end user 500 as well as their preferred language, locale, and preferred path of contact. Public information 1051 may also include confidential digest information which provides a reference to items of information that are confidential, without disclosing the confidential items of information themselves.

Another category of information associated with the GUID 1055 and maintained in directory component 105 is private information 1052 that the end user 500 submits to the hub site 101 and expects will not be shared with any of the providers 600 without the permission of the end user. Such private information 1052 may include, for example, the first and last name of the end user 500, their address, telephone number, and marital status. Yet another category of information is provider preference information 1053. Like private information 1052, in the preferred embodiment, this information will not be provided to any provider 600 without permission of the end user 500. Provider preference information 1053 includes certain preferences of end user 500 for each service 650 offered by provider 600. For example an end user 500 may indicate in his preference in connection with a grocery shopping service that he is allergic to certain types of foods or that he prefers certain other types of foods. In another example, an end user 500 may indicate to a provider that he has particular areas of interest (e.g., cooking, sports, fitness etc.) Provider preference information 1053 of one provider is not, in the preferred embodiment, shared with other providers.

Providers 600 may access directory component 105 (using code manager 220 as described in more detail above) to perform a variety of functions relating to devices and end users 500. In particular, a provider 600 can update, add or remove end user information or device information.

Returning again to FIG. 2A platform 100 also includes wallet component 110. Wallet component 110 stores the financial profile information of end users 500, which facilitates purchasing opportunities. Wallet component 110 comprises specialized profile attributes representing the payment vehicles of end user 500, together with their associated authorization credentials. With reference to FIG. 3, wallet component 110 contains financial information 1101 associated with the GUID 1055 for each end user 500. The financial information 1101 includes credit card numbers, payment vehicles, and billing and delivery addresses. Financial information 1101 may also include access provider identifications, which are associated with the particular end user 500 GUID 1055. Financial information 1101 is, in the preferred embodiment, shared with providers 600 only upon receipt of authentication information from the provider and only if end user 500 provides permission to share such information.

Returning again to FIG. 2A, platform 100 includes scan cache component 107. Scan cache component 107 is used to store lists of scans and other codes inputted by end user 500. In particular, this component is a list-based history of the scanning/code inputting activity of the end user 500. The scan cache component 107 supports the functionality offered to end users 500 via the end user GUI 210. For example, end users 500 employing end user GUI 210 may access the functionality of scan cache component 107 to manipulate lists of scans. An end user 500 may upload and store a list of scans to scan cache component 107. Scan lists may also be deleted using this component.

Figure 4A:
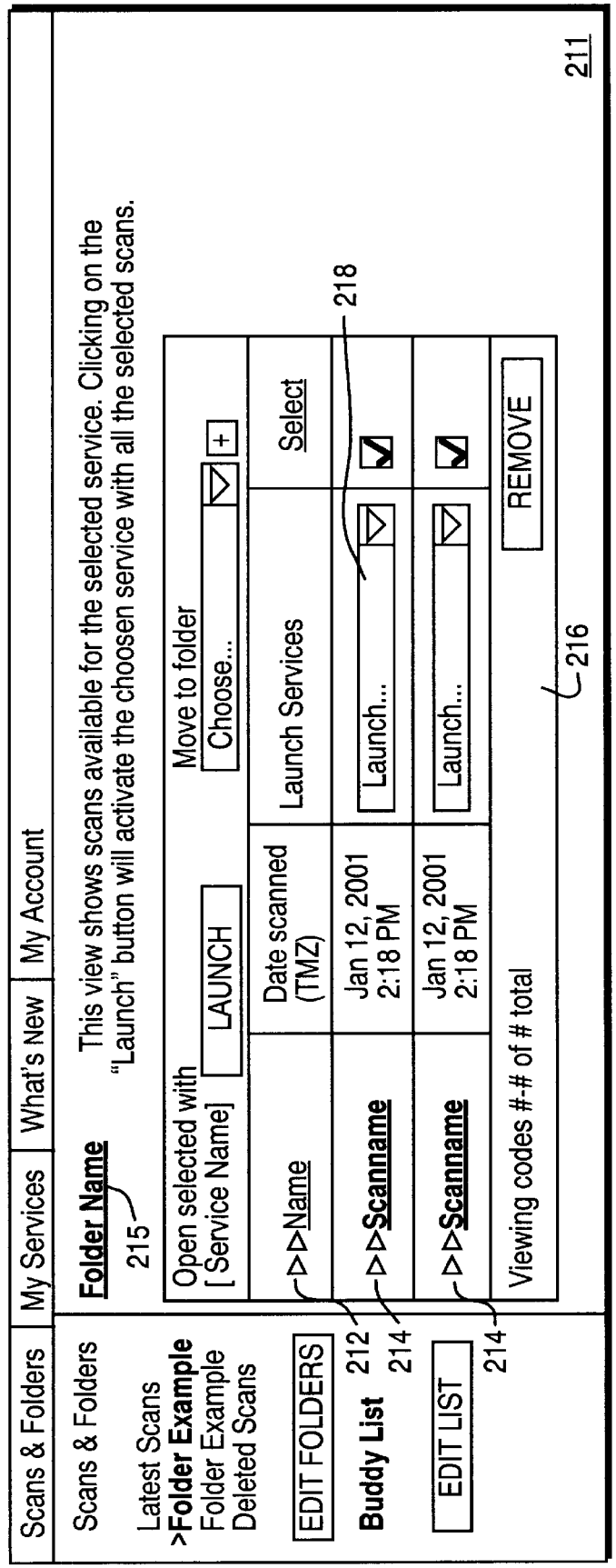
Figure 4C:
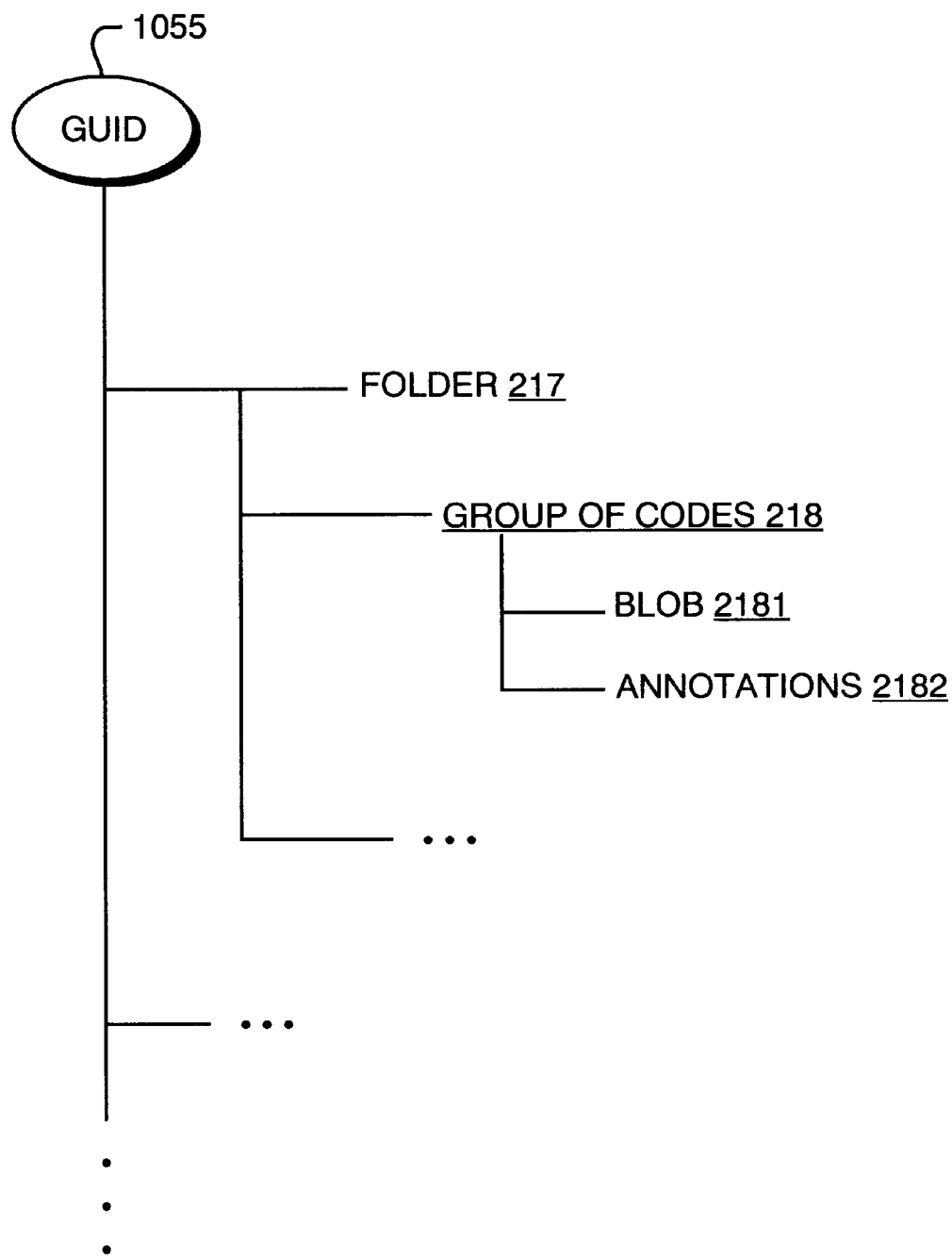
FIG. 4C illustrates a structure for maintaining end user code list folders and associated information in accordance with a preferred embodiment of the present invention.

FIGS. 4A through 4C illustrate an example of one aspect of the end user 500 experience employing end user GUI 210 to access scan cache component 107, in accordance with a preferred embodiment of the present invention. An end user 500 may employ his web browser and navigate to the hub site 101 and be presented with end user GUI 210. With reference to FIG. 4A, the user can establish folders for codes and lists of codes uploaded. The name of the folder is indicated in name area 212 and each scan entry is listed in code description area 214. The date and time the code was scanned or otherwise inputted is indicated in date/time area 216. Services area 218 allows the user to select and launch a particular application associated with the item listed in code description area 214.

With reference to FIG. 4B, the end user 500 may navigate to screen 213 by clicking on code description area 214 of screen 211 of FIG. 4A. Here, the user may provide a description of each scan and a particular folder. Each folder established by an end user 500 is associated with the GUID 1055 of that particular end user. As described previously, each folder includes a group of codes. In addition, the end user 500 may supply annotations to a particular folder using screen 213 of FIG. 4B in annotation area 2130. Such annotations may be, for example, the quantities of particular items on a grocery list of food items scanned by the end user. Another example of an annotation might be a list of items the end user desires for his birthday.

The end user 500 may also employ a particular service/application that transforms a mere list into a useful structure. For example, the user may employ a grocery shopping service that takes a list of items that the user has scanned, along with the user's preferred grocery store, and provide the user with an aisle-by-aisle identification of where the user can find each of the items on his list.

Also associated with the group of codes in the preferred embodiment is a binary large object ("BLOB") for the particular service/application 650 employed by the end user 500. The BLOB includes information that the particular service provider has indicated, on behalf of the end user 500, should be stored along with the group of codes (e.g., quantities of a particular desired item, sales promotions of which the user has taken advantage). In a preferred embodiment, the BLOB is not shared among providers and is only accessible by the particular provider that established it, in contrast to the annotation information which is visible and shared among providers.

FIG. 4C illustrates the manner in which folders 217, associated with a particular GUID 1055, comprise groups of codes 218, which have both BLOBs 2181 and annotations 2182 associated with them. This information (i.e., the group of codes associated with each GUID and its associated BLOBs 2181 and annotations 2182) is saved in scan cache component 107. Thus, the value added by a user in making an annotation to the list (e.g., taking a grocery list and creating a recipe by adding quantities associated with each grocery item) or applying a service 650 to the list, along with the BLOB, is preserved across all interactions for that end user 500 for the particular service provider. This value can then be passed along to others by the end user 500, for example, by emailing the recipe to another user. The other user may not previously have been sponsored on the network, but may become so upon receiving the recipe. Thus, a further commercial advantage is obtained.

Returning again to FIG. 2A and a description of the components of platform 100, code profile component 108 stores information about codes and the services associated with the codes. In general, the filtering functionality of platform 100 uses code profile component 108 to take a series of codes (inputted by an end user 500 through scanning or other inputting techniques) and turn the codes into actions. In particular, code profile component 108 uses active operational mapping from a code inputted by an end user 500, profile information of the end user 500 (including preferences and any services to which the end user 500 has subscribed) from directory component 105; device profile information of the device used to input the code (including ownership information and any restrictions placed on usage) from directory component 105; and context information (i.e., property information of a session of the end user 500 on the network) to return to the end user 500 pointers to specific services/applications 650.

Thus, upon uploading a list of scans/code inputs, code profile component 108 returns a unique alpha-numeric identifier (also referred to herein as a "ticket") associated with the list and the URL of the service to which the ticket should be sent to obtain the service. Further, in response to a ticket supplied by an end user 500, code profile component 108 returns the available services and mappings for each code associated with the ticket.

Code catalog component 109 handles information, life cycle, and ownership properties for codes, services, and their respective mappings. In particular, code catalog component 109 allows for the linking of codes to services/applications 650. Code catalog component 109 allows for the creation of new services by providing parameters such as URL, title and description. The provider 600 may specify service contexts, as well as specify, and narrow, the items displayed to a user based on a particular code, alter the size of the content returned, and/or alter the starting point for the list of items returned to the user. For example, it may be specified that only end users 500 with a particular context be allowed to use a certain service (e.g. users that input codes via a cellular telephone may not be allowed to obtain access to information or services that include graphics). Code catalog component 109 also allows for the creation of operational accounts, which specifies ownership of services, lists, contexts, and private codes, as discussed in more detail with reference to FIG. 1B. Providers 600 may also specify private codes using this component.

Figure 2B:
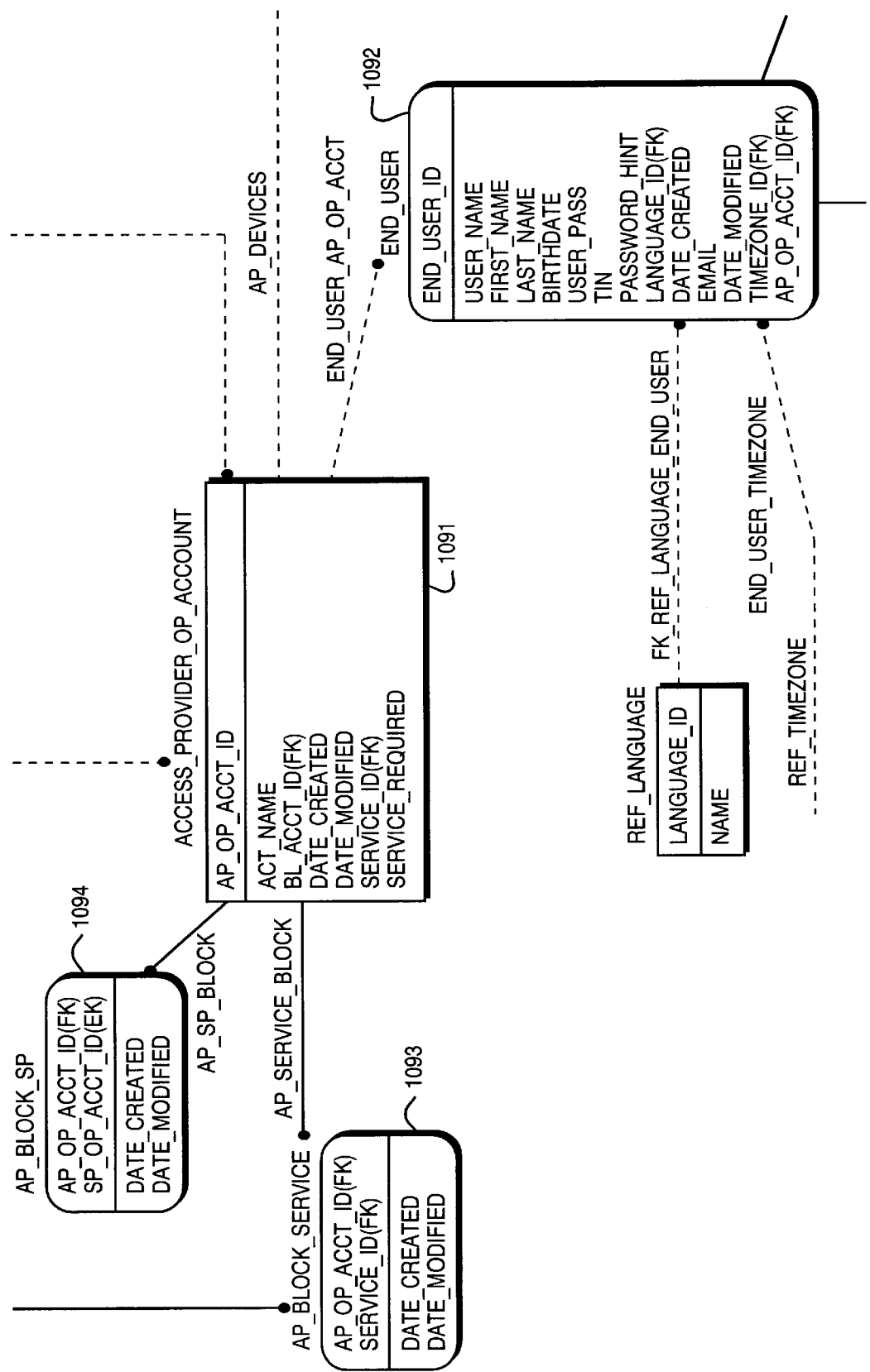
FIG. 2B illustrates a fragment of a code catalog database which may be used in accordance with a preferred embodiment of the present invention.

An access provider may use code catalog component 109 to express negative options as they relate to services provided by a competitor. FIG. 2B shows a portion of a database that might be included in code catalog component 109, in a preferred embodiment. Access provider account table 1091 allows for the identification of an access provider. End user table 1092 identifies an end user 500 owned by the access provider identified in table 1091. Using block service table 1093, the access provider identified in table 1091 can block or prevent the user identified in table 1092 from being presented with a particular service identified in table 1093. Similarly, using block service provider table 1094, the access provider identified in table 1091 can block or prevent the user identified in table 1092 from being presented with any service offered by the service provider identified in table 1094. The ability of an access provider to establish these blocks is also illustrated in FIG. 1B.

Content catalog component 111 serves as a repository and loading facility for product information. For example, content catalog component 111 may include two separate sets of product data: (1) a generic product title, description and categories that can be used by platform 100; and (2) vendor specific product data such as pricing, proprietary descriptions, and URLs. Content catalog component 111 is used to supply product information to code catalog component 109 that is too volatile or large to store in the code catalog component 109. Searching may also be performed in content catalog component 111 to, for example, obtain information relating to the manufacturer of a product associated with a particular code or key word. This component also accepts the input of a particular code or key word and returns a list of specific information associated with the code or key word. In some embodiments, this searching can be performed only by employees of the access provider while in other embodiments, end users 500 could be allowed access to these searching capabilities.

Figure 5A:
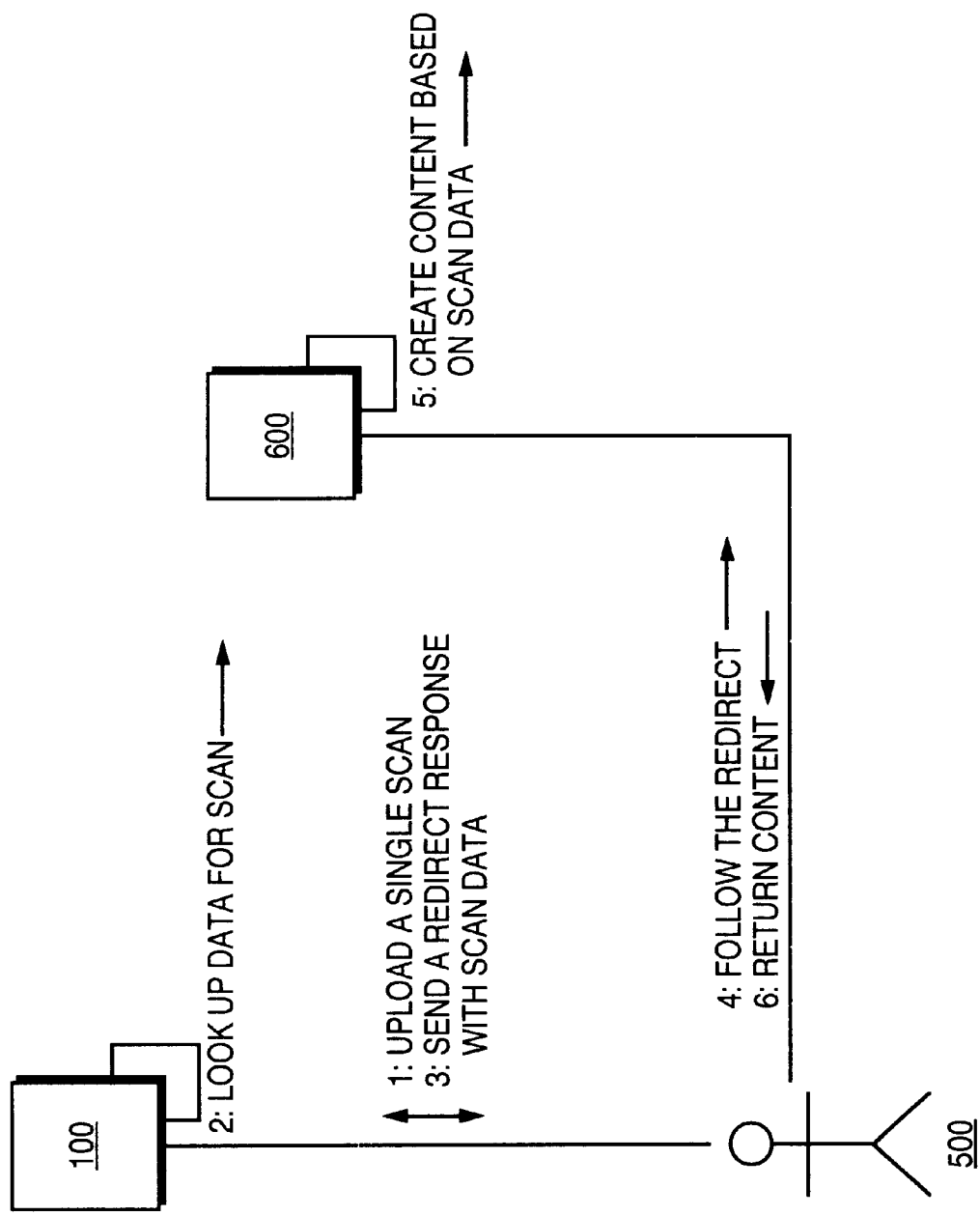
FIG. 5A and 5B illustrate two examples of the manner in which information may flow between the components of a preferred embodiment of the system of the present invention.
Figure 5B:
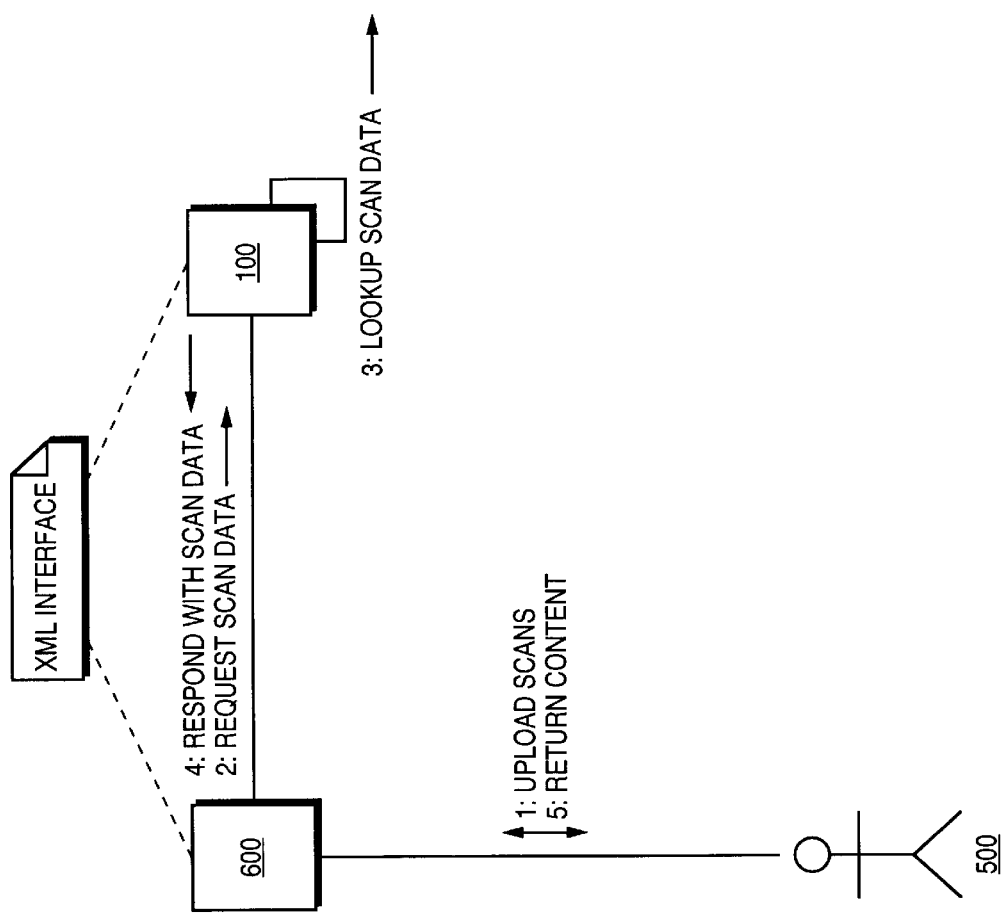

FIGS. 5A and 5B illustrate two examples of the way in which information may flow among an end user 500, the platform 100, and providers 600 of FIG. 2A. With reference to FIG. 5A, in step 1, end user 500 uploads a single scan to platform 100. In step 2, platform 100 looks up the codes associated for the scan and, in step 3, sends end user 500 a redirect response to the provider 600 with the scan data. In step 4, end user 500 follows the redirect to provider 600. In step 5, provider 600 creates content based on the scanned data and returns the content to end user 500, in step 6. With reference to FIG. 5B, end user 500 uploads scans in step 1 to provider 600. In step 2, provider 600 requests scan data from platform 100, which looks up the scanned data in step 3. In step 4, platform 100 responds to provider 600 with the scanned data. In step 6, provider 600 returns content to end user 500. Other information flows will be known to those skilled in the art and are within the scope of the present invention.

Figure 6B:
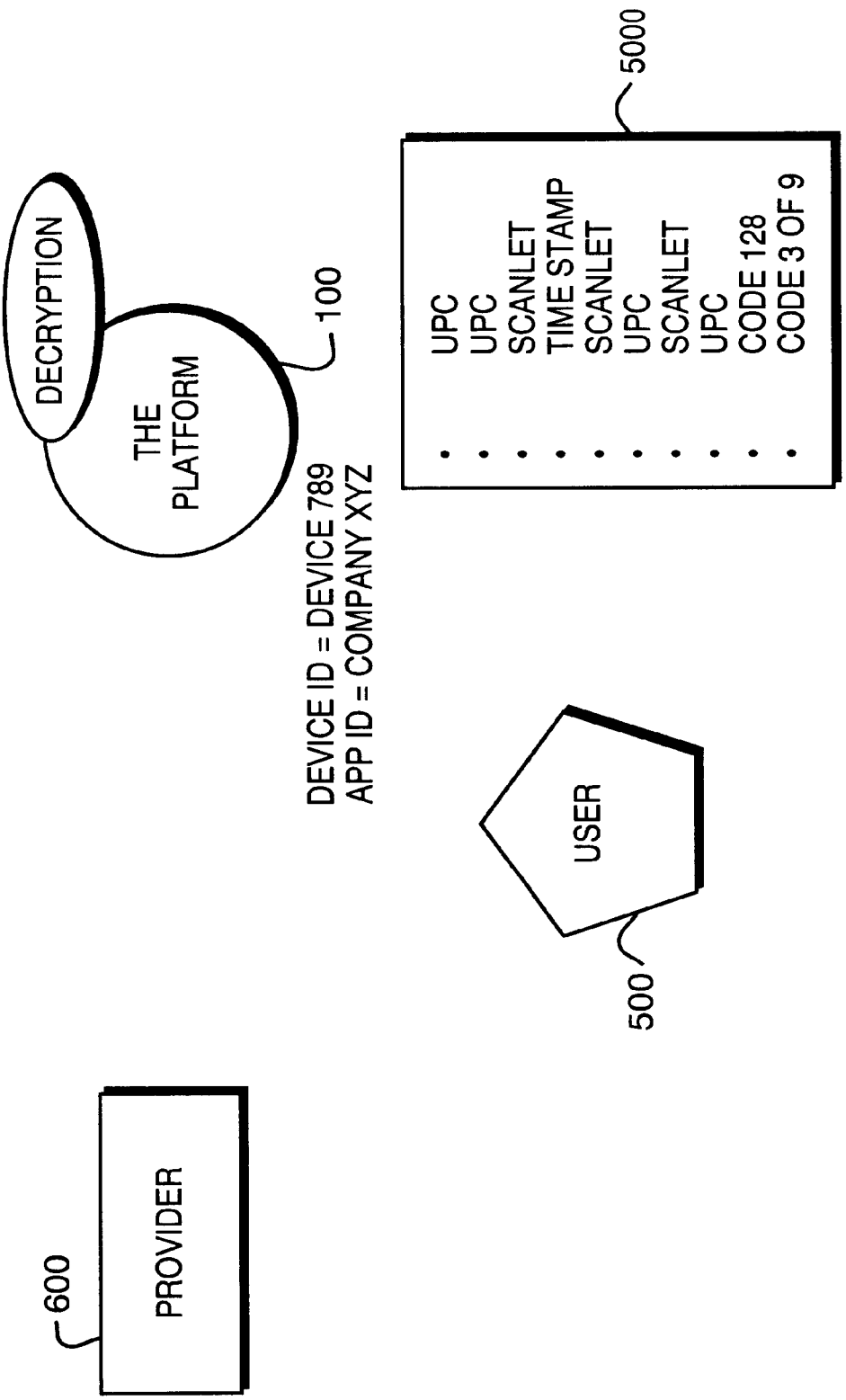
FIGS. 6A through 6R illustrate an example of the manner in which the methods of the present invention may be carried out in accordance with a preferred embodiment of the present invention.
FIG. 6S illustrates examples of user interfaces on a cell phone that may be used in a connection with accessing services in accordance with a preferred embodiment of the present invention.
Figure 6C:
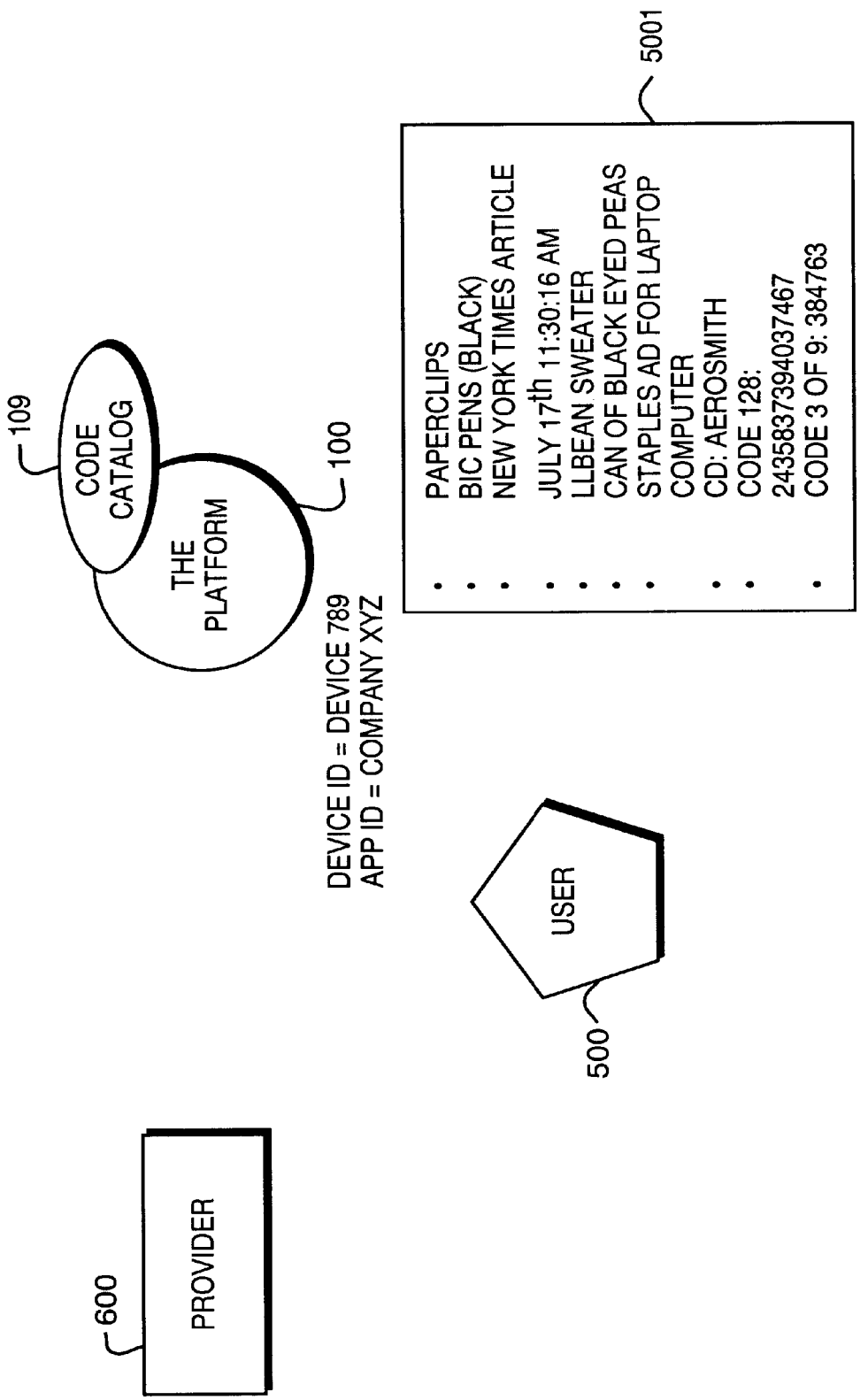
Figure 6D:
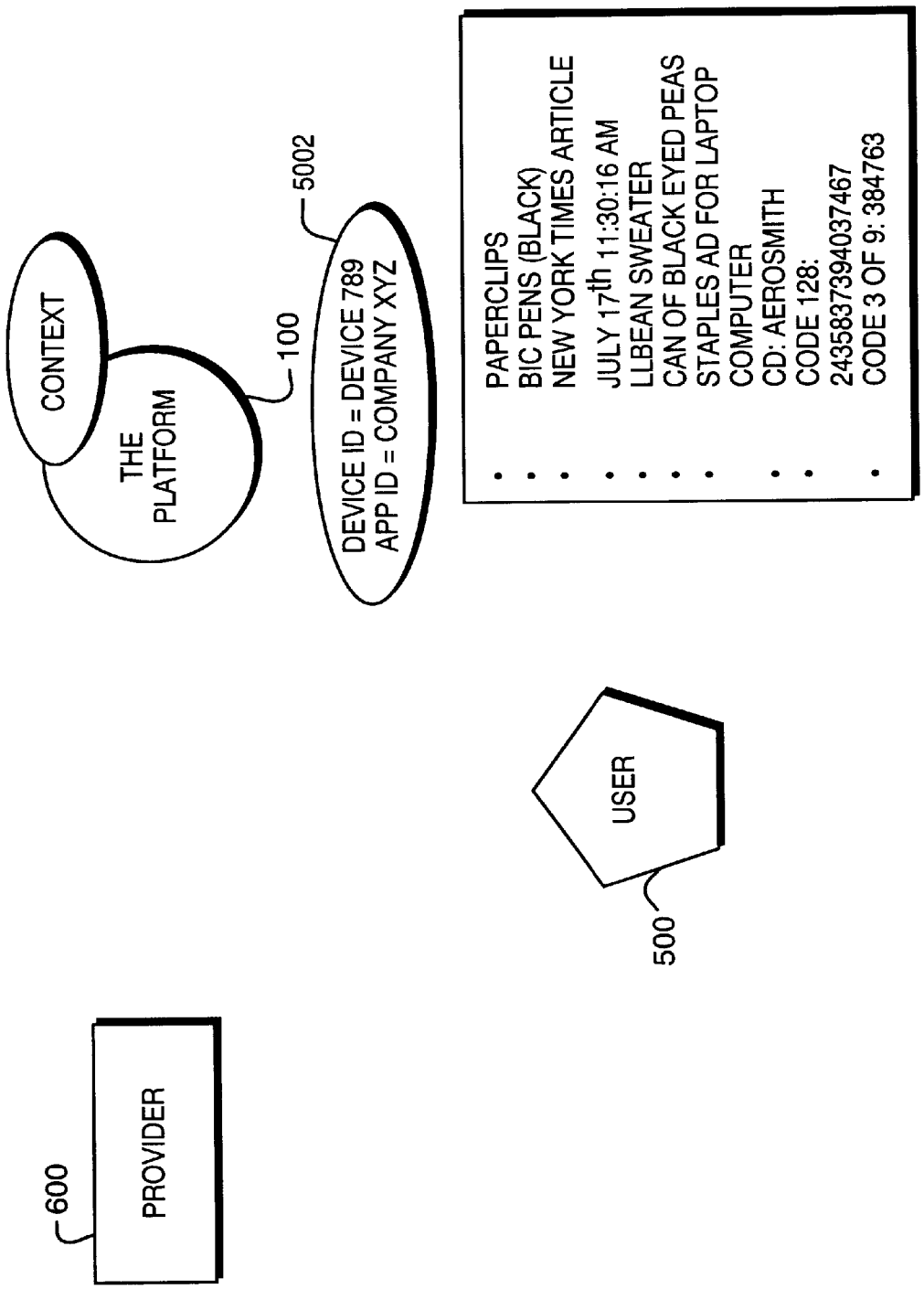
Figure 6E:
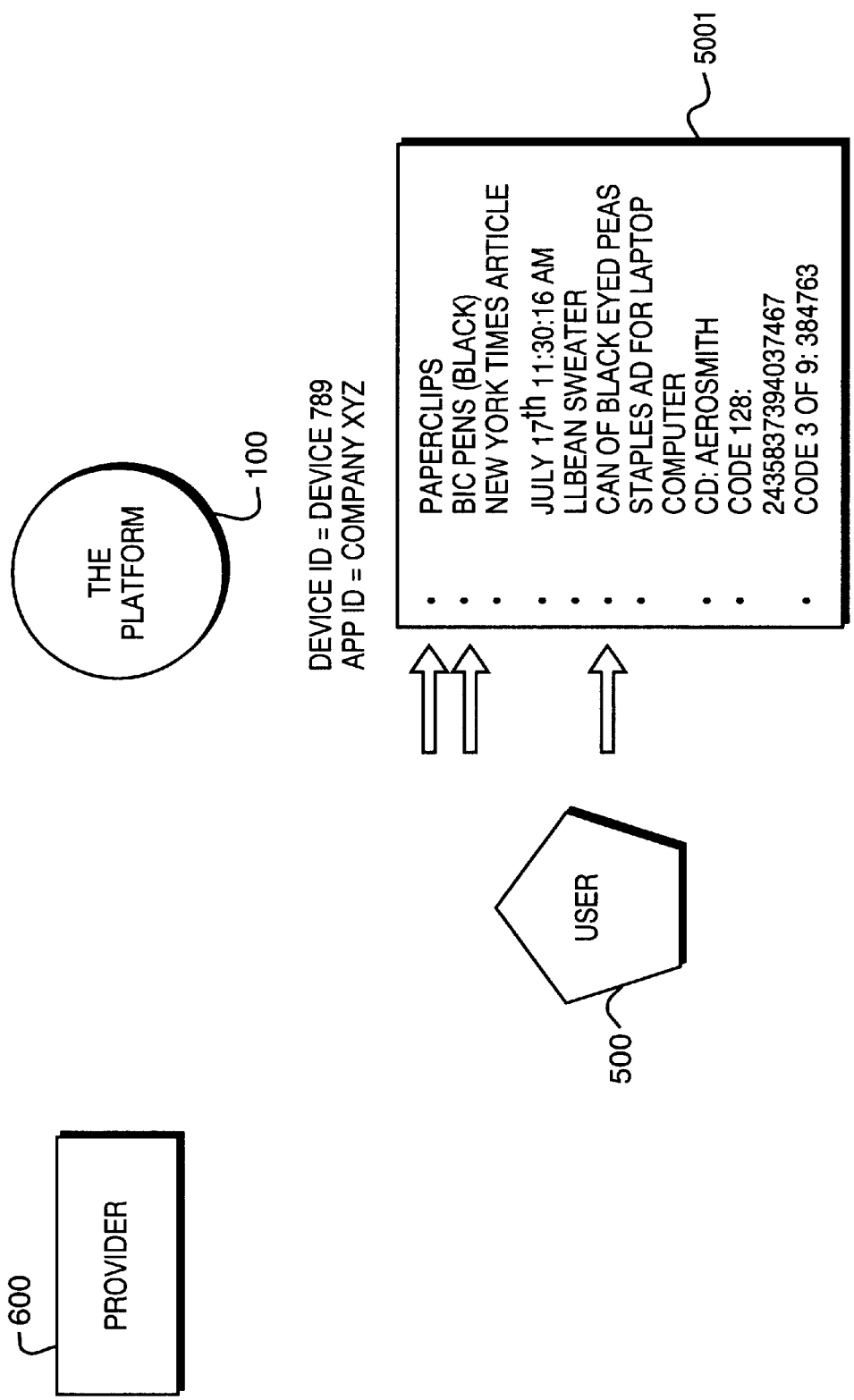
Figure 6F:
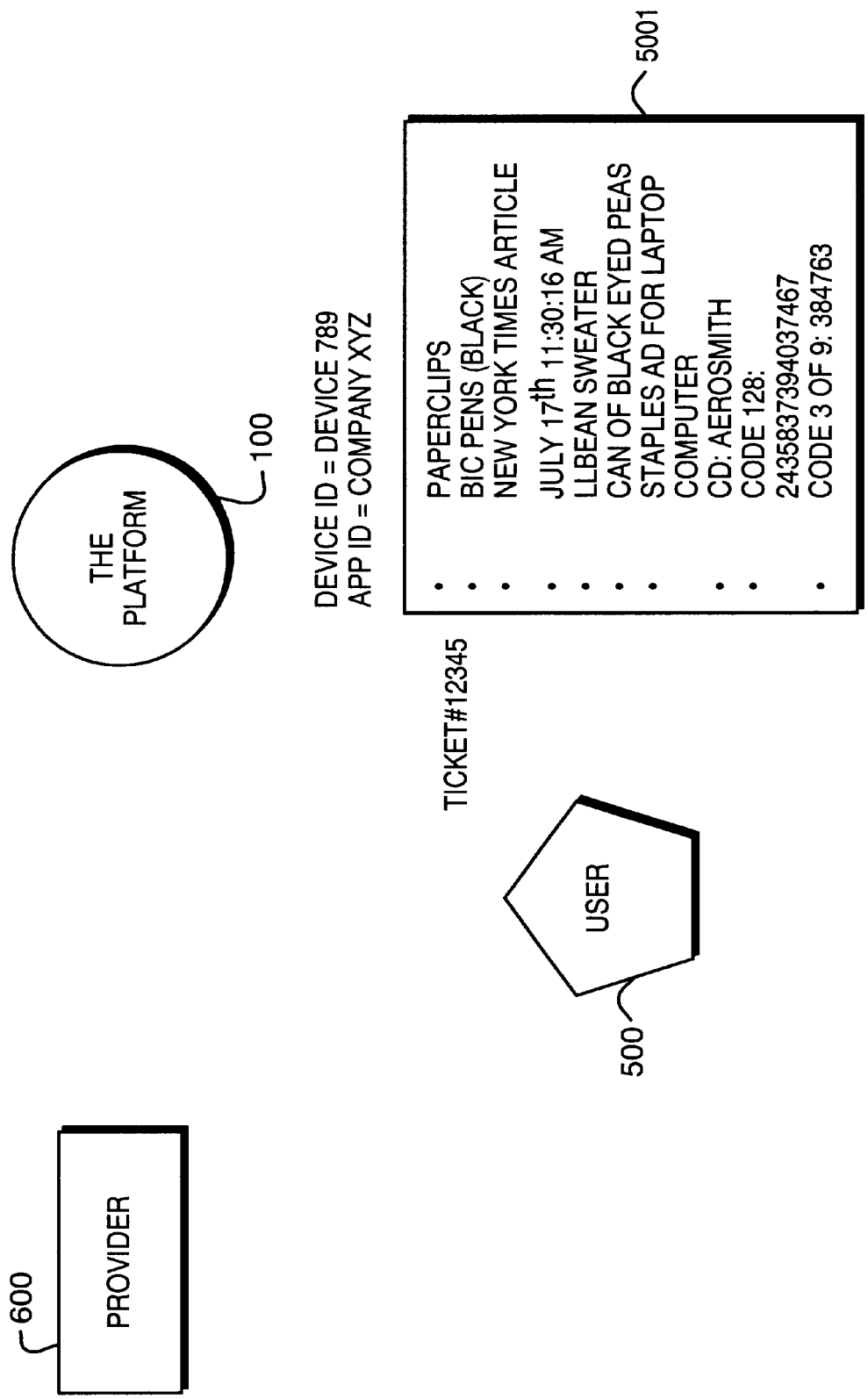
Figure 6G:
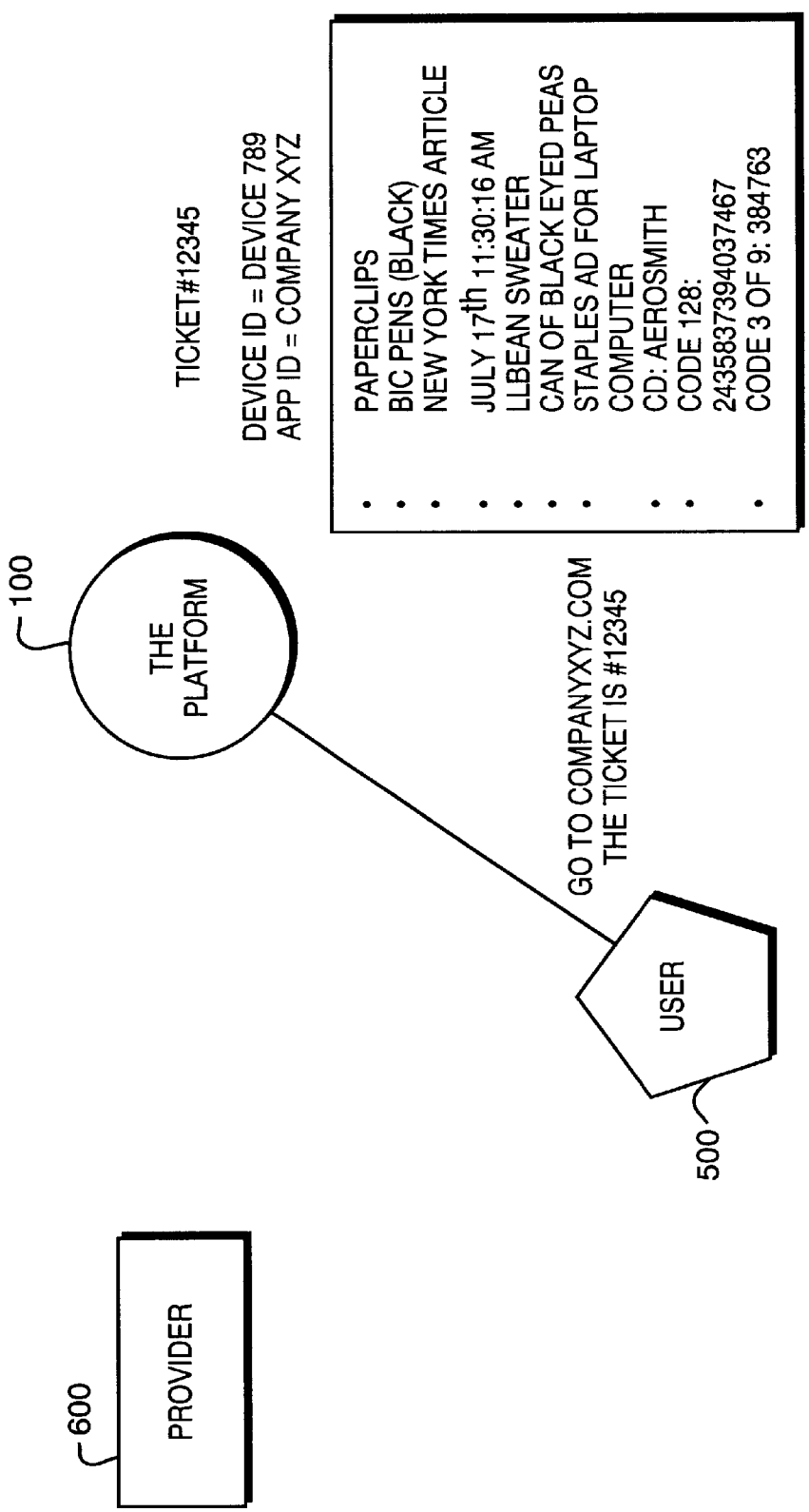
Figure 6H:
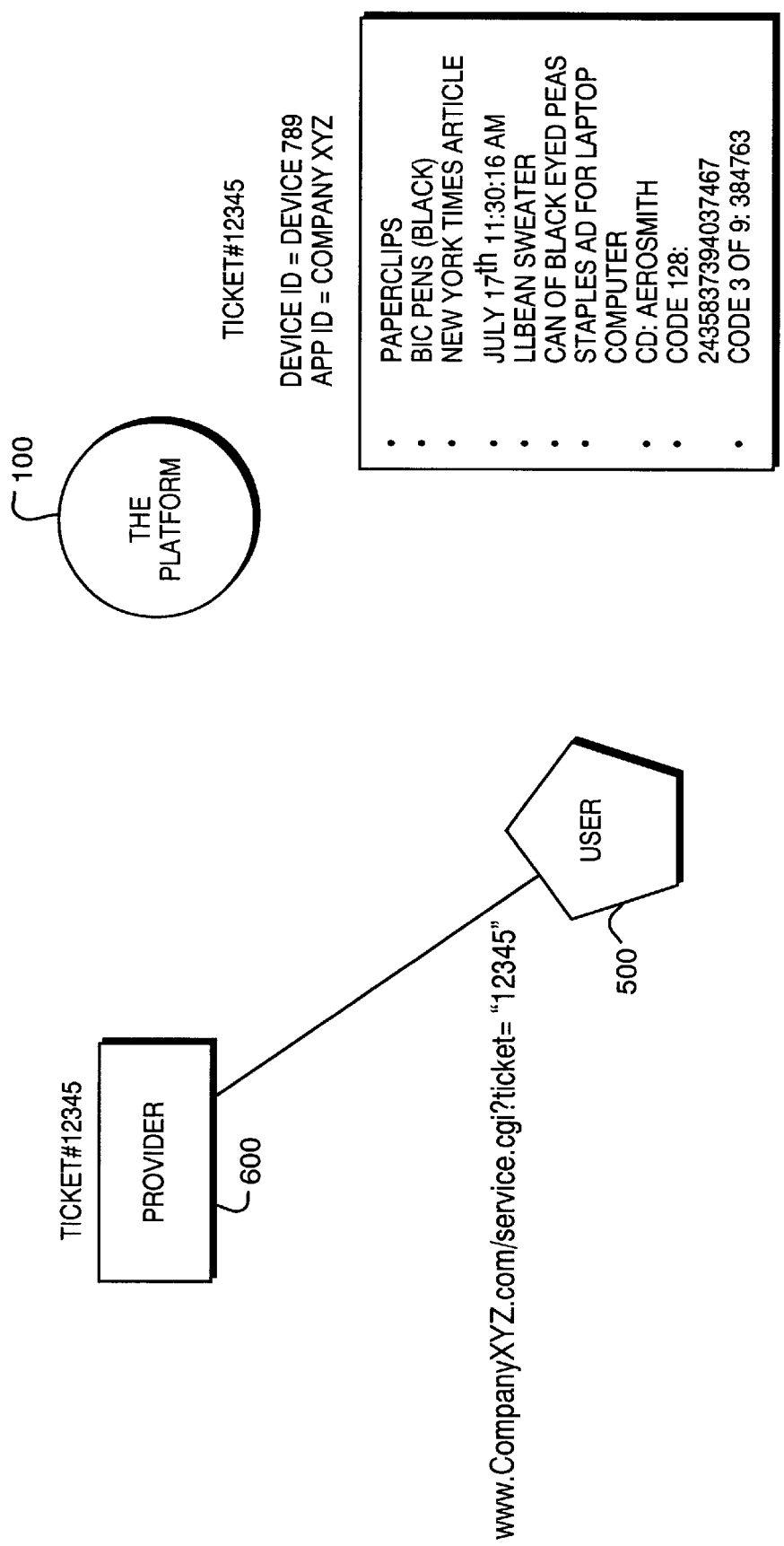
Figure 61:
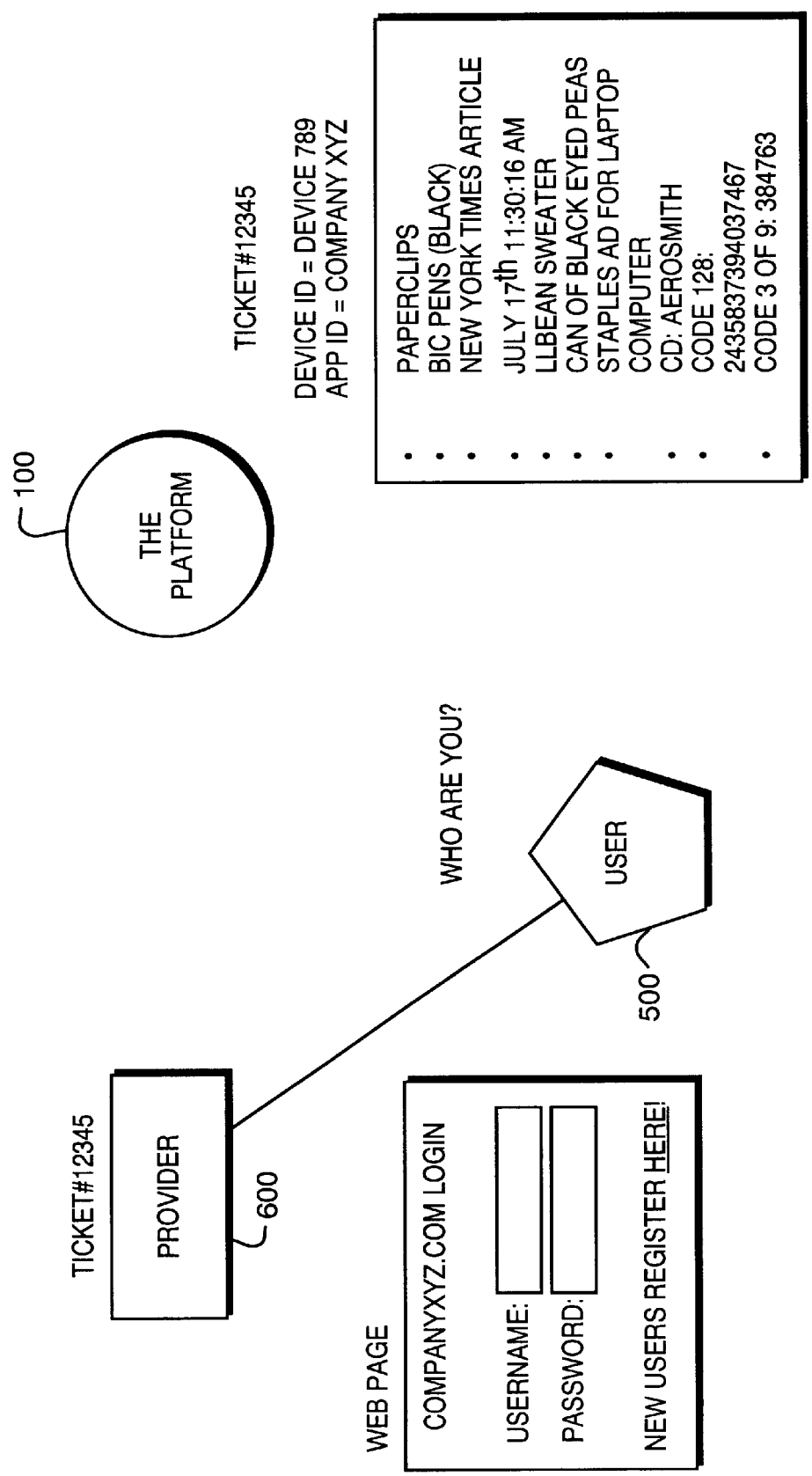
Figure 6J:
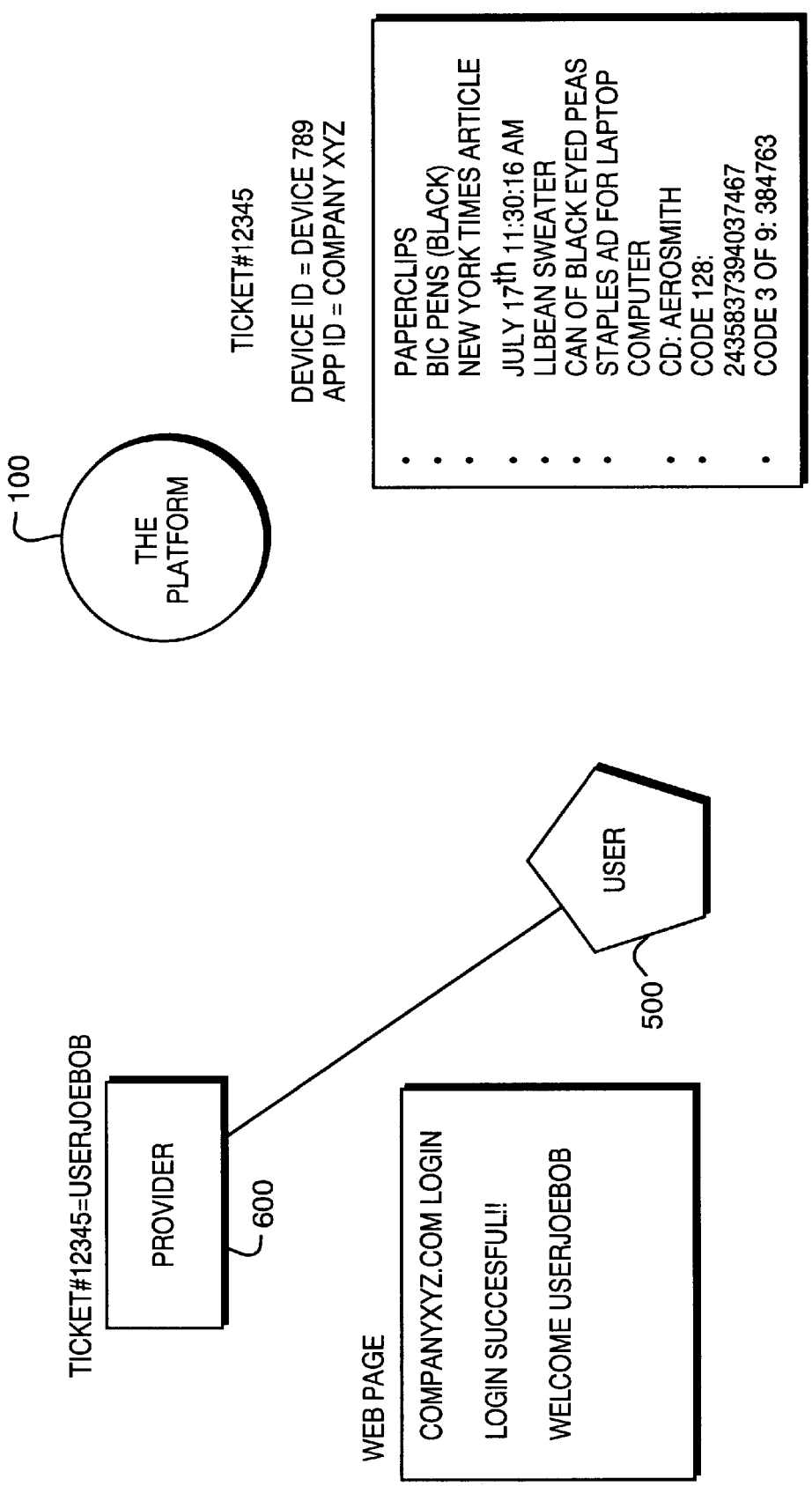
Figure 6K:
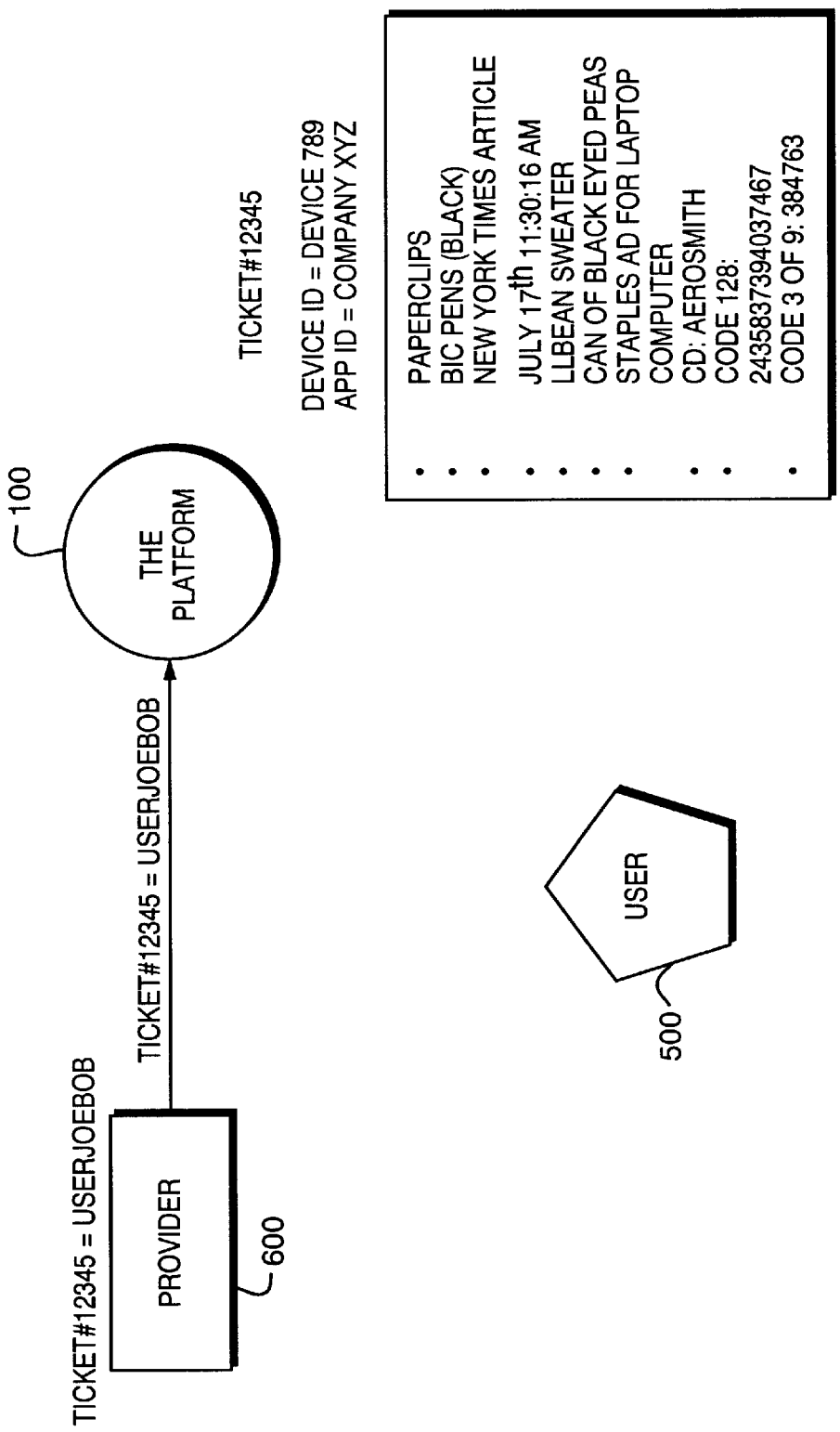
Figure 6L:
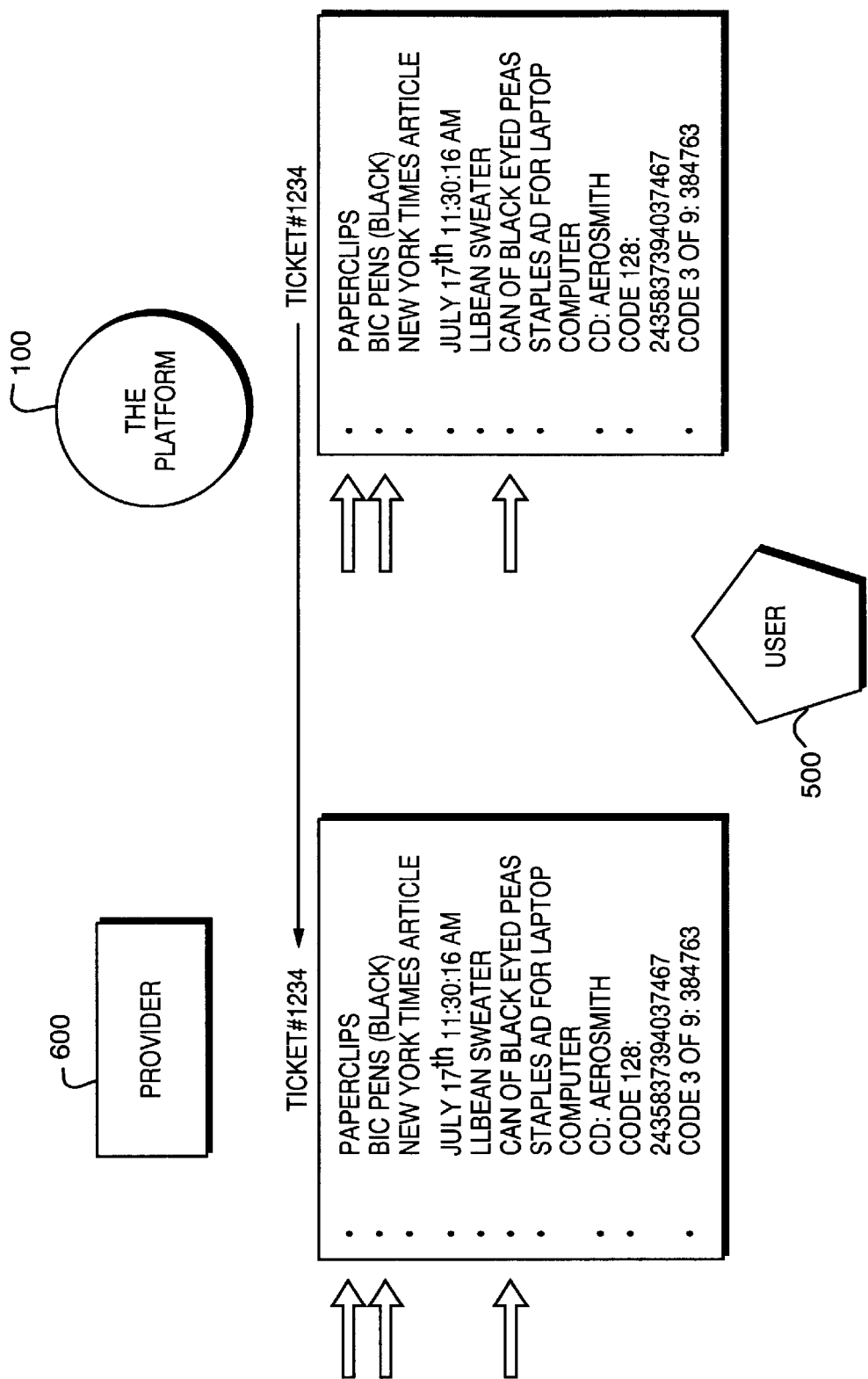
Figure 6M:
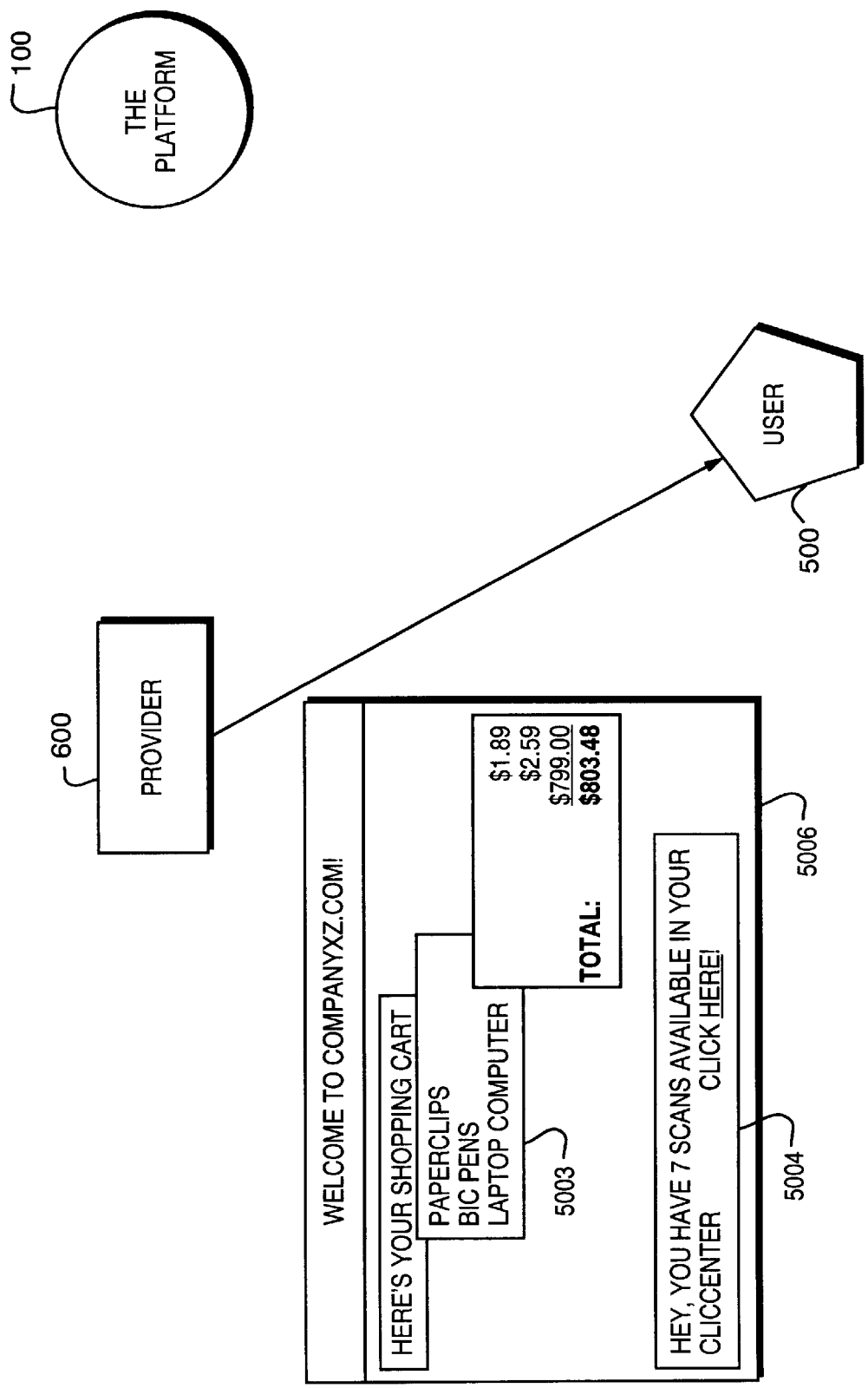
Figure 6N:
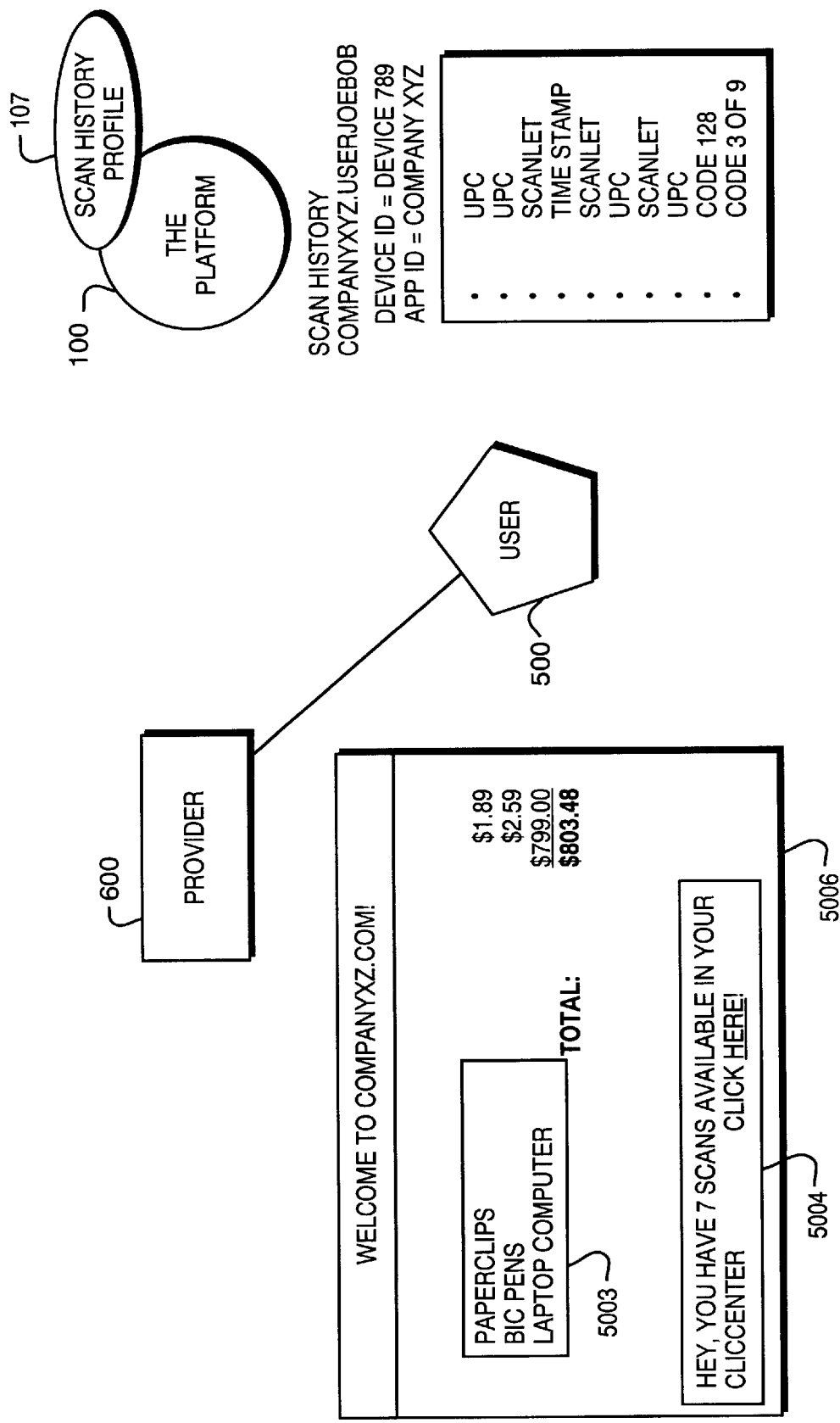
Figure 60:
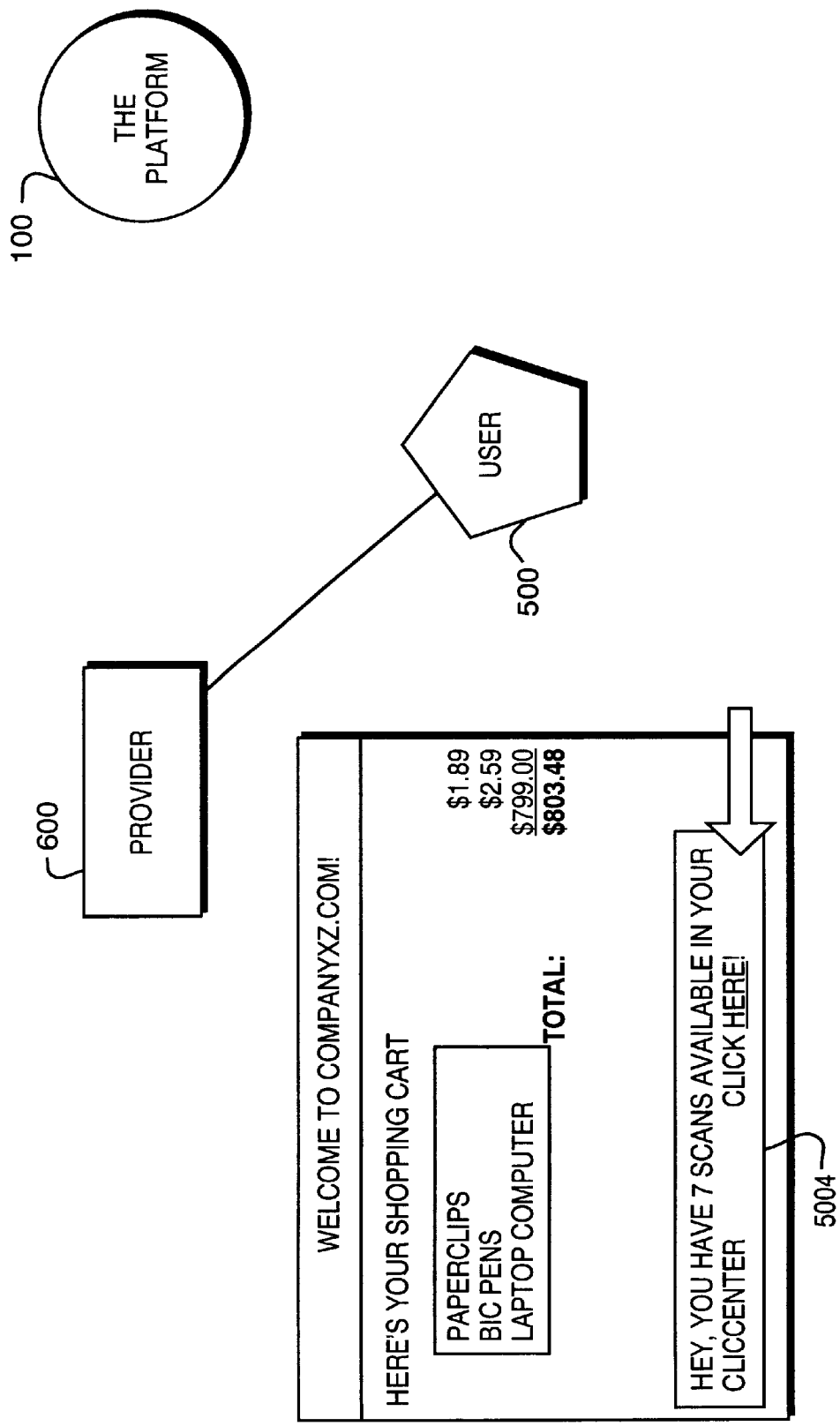
Figure 6P:
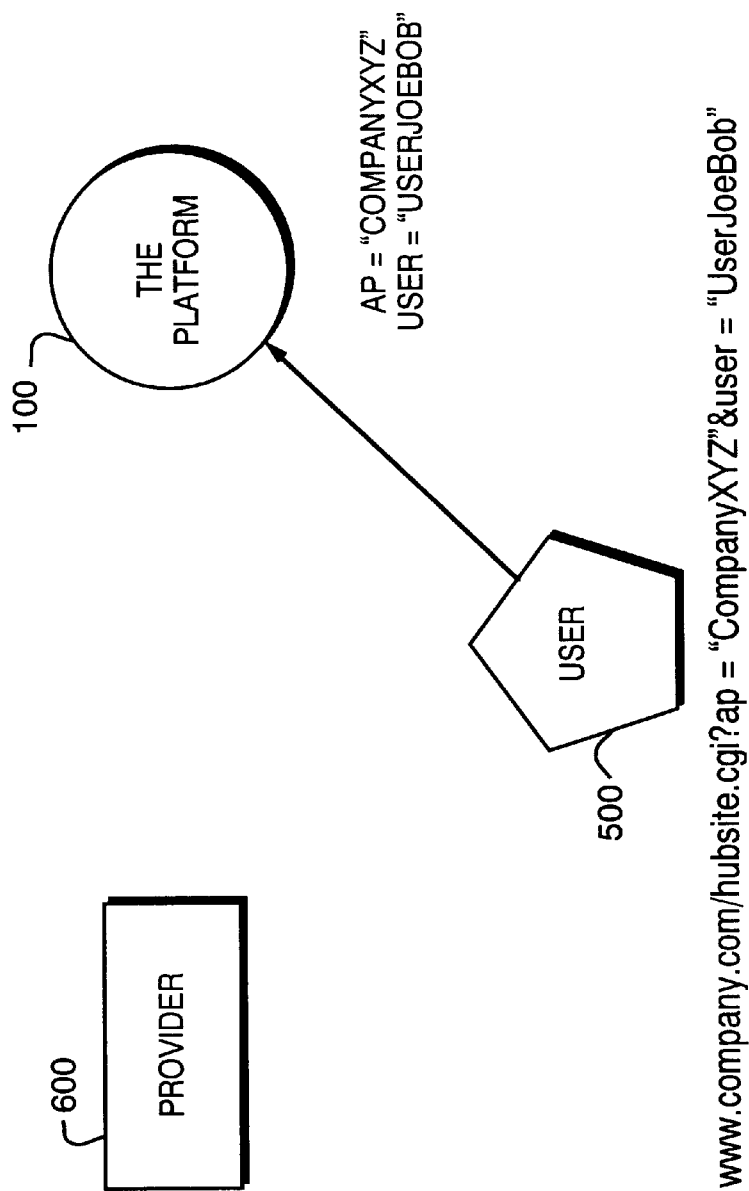
Figure 6Q:
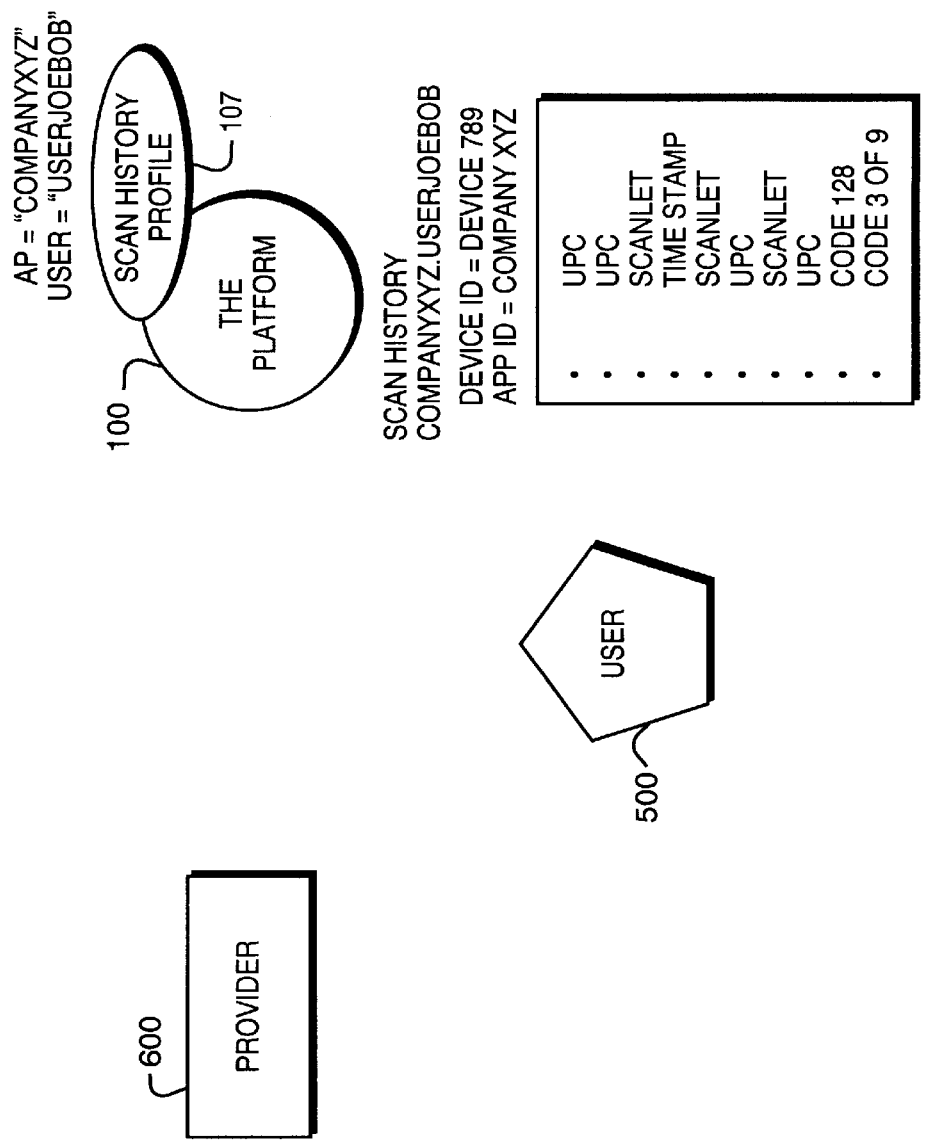
Figure 6R:
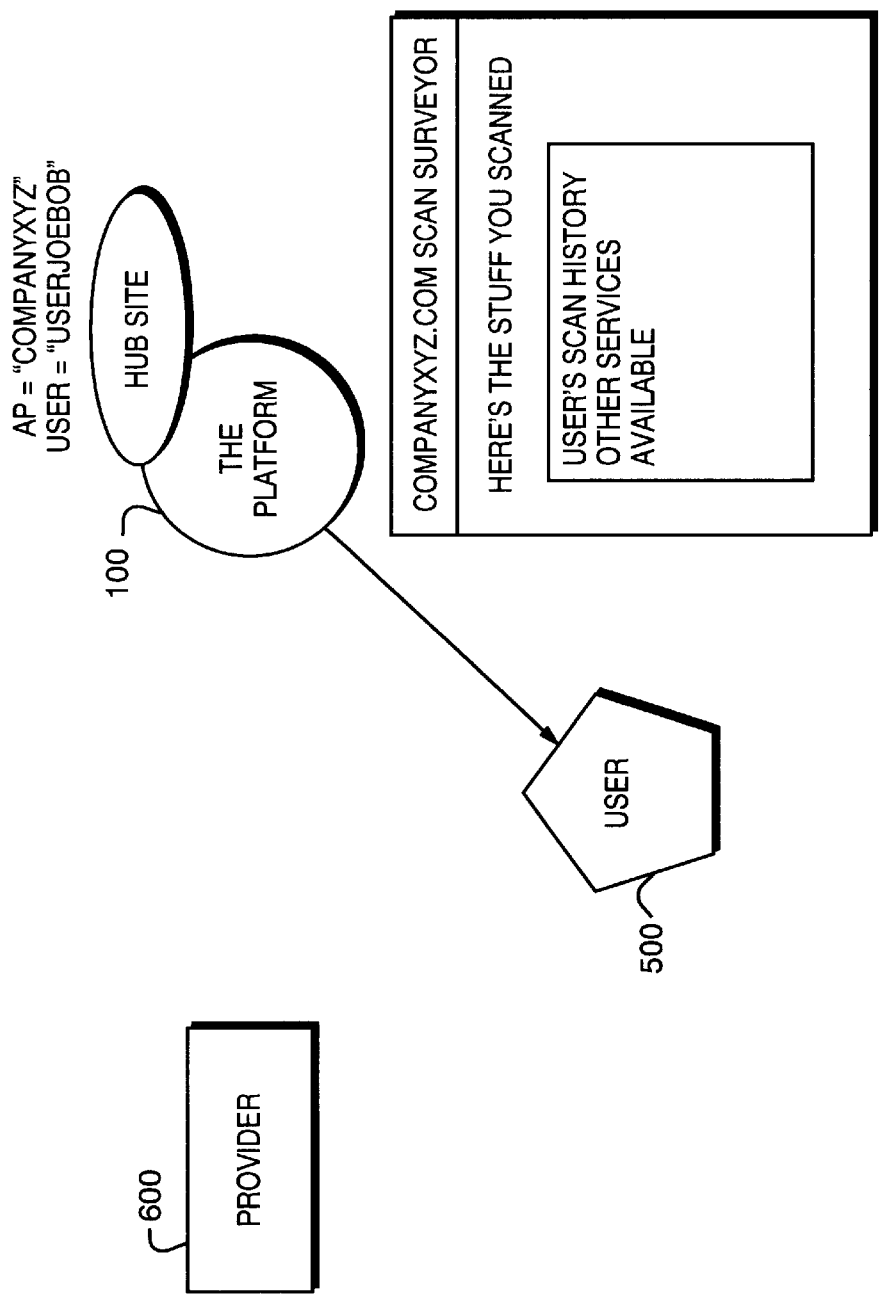

A more specific example is shown with reference to FIGS. 6A through 6R. With reference to FIG. 6A, an end user 500 has purchased a device from an access provider 600. Thus, the device and its associated identification number are registered within the platform 100 as belonging to access provider 600 and all scans uploaded by this device will be subject to the access provider rules (e.g., the access provider may prevent end user 500 from accessing services offered by competitors of the access provider). In this example, the access provider 600 also serves as a service provider. End user 500 registers with access provider 600, given that access provider 600 is responsible for registration and authentication in its community. End user 500 is assigned a user identification number by access provider 600. End user 500 is then "owned" by access provider 600 for purposes of the activities of end user 500 in using the services of access provider 600. In the preferred embodiment, end user 500 may download and install software that will assist it in interacting with platform 100. This software has an application identification number registered to access provider 600. Access provider 600 is able to control the user experience of end user 500 by writing rules in platform 100.

Using the device, end user 500 may scan ten items and, subsequently, upload the codes associated with the scans using his personal computer to platform 100. In one embodiment, the codes are encrypted and, thus, the platform 100 must decrypt the codes. Upon decryption, the device identification number (from the device) and application identification number (from the software) 5000 are identified, along with the codes associated with the scans, as shown with reference to FIG. 6B. This allows platform 100 to identify the codes as belonging to access provider 600 (here, Company XYZ).

With reference to FIG. 6C, once the codes have been decrypted, platform 100 can look up what each code represents (in code catalog component 109 of FIG. 2A), as shown in area 5001. In addition, each code has one or more services associated with it and corresponding service specific information (e.g., a URL needed to launch a service associated with the code and identify the same within the database of the service provider). In this example, one of the UPC codes was found on a box of paperclips. Platform 100 may identify a number of service providers that offer a service associated with the paperclips.

However, as shown with reference to FIG. 6D, the device identification number and application identification number 5002 are uploaded along with the codes. This allows platform 100 to determine (by consulting context information in code profile component 108) the access provider rules that platform 100 is to follow. In this example, the provider 600 rules dictate that the end user 500 is to be presented only with its service, excluding other services that purport to offer a service related to the paperclips. In a specific example, the provider 600 rules may dictate that the end user 500 not be presented with any service that is offered by a competitor of provider 600.

With reference to FIG. 6E, platform 100 selects codes that are applicable to the services offered by provider 600 and retrieves the service specific information for that provider. In this example, three codes out of the ten are so applicable. As indicated in code area 5001, with reference to FIG. 6F, the list of codes and service information for the provider 600 is stored in a temporary location within platform 100. This location is assigned a unique alpha-numeric identifier or ticket number. In this example, the ticket number is 12345.

With reference to FIG. 6G, the platform 100 sends a signal to end user 500 directing the user's personal computer to open a browser window to a UPL indicating the location of the provider 600 and also providing the ticket information. With reference to FIG. 6H, the personal computer of the end user 500 opens a browser to the specified URL at the provider 600. The URL includes the ticket number information. With reference to FIG. 6I, the provider 600 is responsible for authentication and thus requests the end user 500 to enter its user name and password. Upon successful log in, provider 600 associates the end user 500 with the ticket number, as shown with reference to FIG. 6J.

With reference to FIG. 6K, provider 600 uses the ticket to request of platform 100 the list of codes that the user 500 previously uploaded and that are associated with the ticket. At this point, platform 100 will require that provider 600 supply its user name to create a scan history for the end user 500. With reference to FIG. 6L, a copy of the code list represented by the ticket number is sent by the platform 100 to the provider 600. Included in the code list is the provider specific service information for the three codes that provider 600 can use. With reference to FIG. 6M, provider 600 converts the list of codes into a user interface and displays it to user 500 via his web browser, as shown in exemplary interface 5006. Interface 5006 indicates the three items available through provider 600 in area 5003 and also indicates, in area 5004, that there are additional items available to the user 500. With reference to FIG. 6N, platform 100 saves all of the ten uploaded codes in scan cache component 107. This particular scan history profile is identified uniquely with provider 600.

With reference to FIG. 6O, assuming the end user 500 wishes to review the seven other available scans, he will click on area 5004. With reference to FIG. 6P, the browser of end user 500 is redirected back to the end user GUI 210 of platform 100 along with information identifying the access provider 600 information and the end user 500 information. With reference to FIG. 6Q, using the access provider 600 information and the end user 500 information supplied via the URL, platform 100 can retrieve from scan cache component 107 the scan history profile which is used to present an end user GUI 210 to the user 500 branded in accordance with the access provider identified. With reference to FIG. 6R, platform 100, using the provider-branded end user GUI 210, presents all the services available via the hub site 101 to the end user 500. In this case, the access providers rules still apply and user 500 will be prevented from viewing services offered by a competitor of provider 600. The user may then launch all services presented.

Figure 6S:
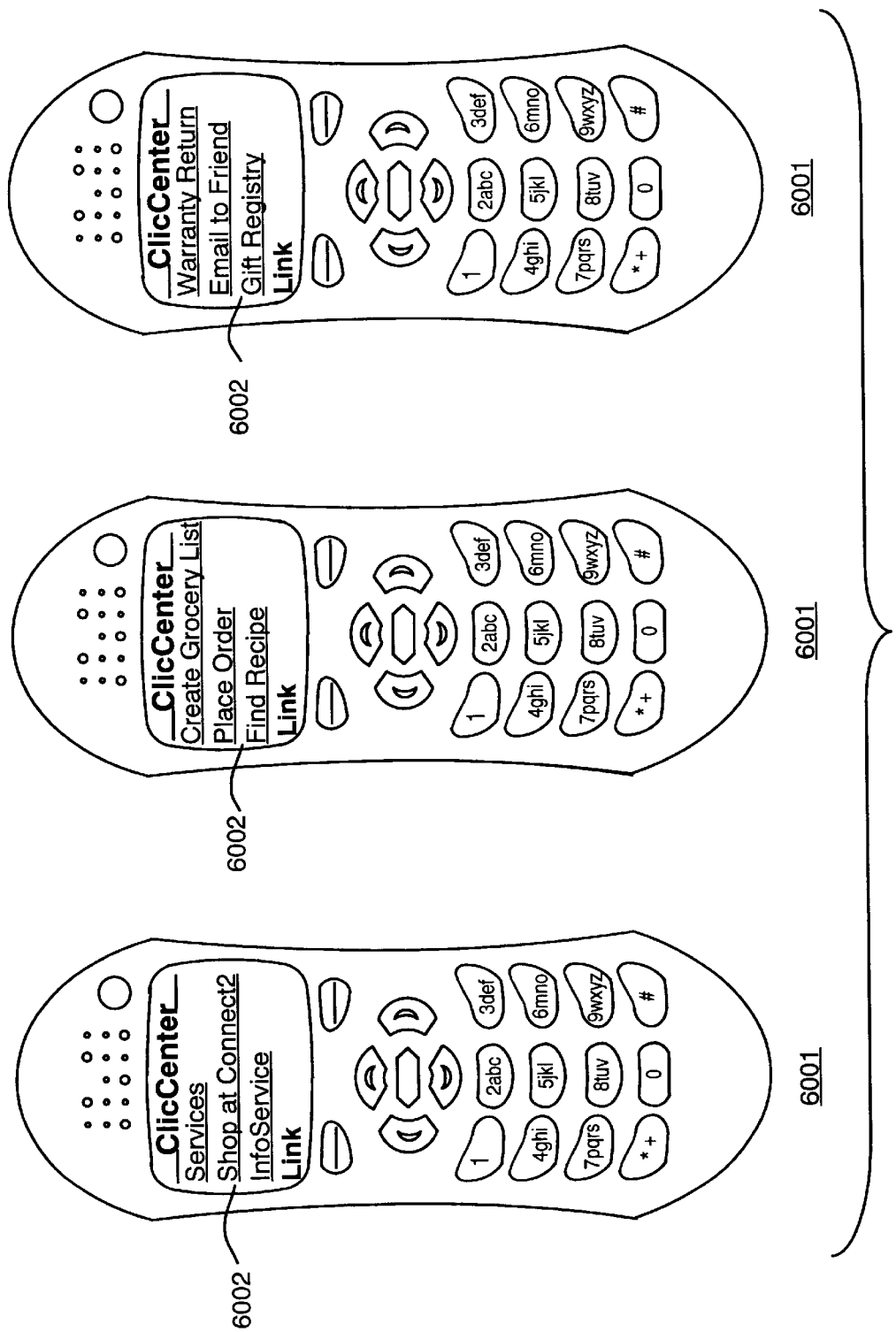

In the end user 500 experience illustrated with reference to FIGS. 6A through 6R, end user 500 demonstrated his expressed goals by indicating his desire to make a purchase, as illustrated in FIG. 6M. End users 500 may have a variety of different expressed goals, for example, buy, sell, research, include, forward etc. For example, FIG. 6S illustrates exemplary user interfaces 6002 on a cellular phone 6001. Shown on interfaces 6002 are bookmarks identifying services that the user may select. By selecting a particular bookmark, the end user 500 has indicated his expressed need.

Figure 7:
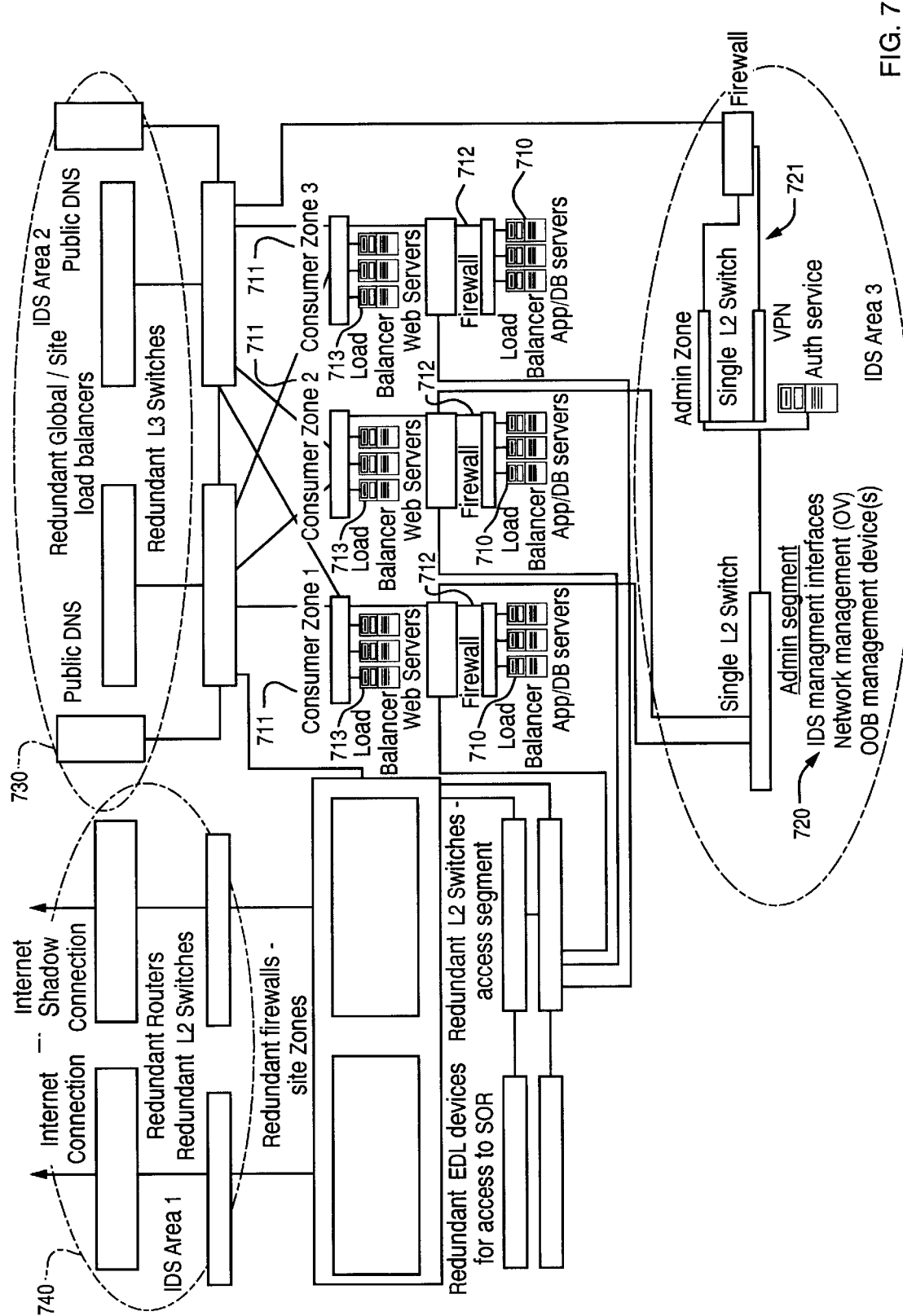
FIG. 7 illustrates a preferred embodiment of a system that may be used to carry out the methods of the present invention.

FIG. 7 provides an example of a preferred embodiment of a system 7000 that may be used to implement the methods of the present invention. Calls made by end users 500 through the end user GUI 210 (described with reference to FIG. 2A, for example) may be satisfied by consumer zones 711, each of which includes web servers 713 and application servers 710. Each consumer zone 711 also includes fire walls 712. While this exemplary embodiment depicts three consumer zones 711, any number of consumer zones may be employed, as needed, in accordance with the present invention. Thus, system 7000 is scalable. Administrative segment 720 satisfies calls made through account manager 230 and code manager 220, as described with reference to FIG. 2A. Authentication of end users may also be carried out through authentication service 721 of administrative segment 720. Statement of record area 730 provides back up of all the information maintained on platform 100 (described with reference to FIG. 2A) and, thus, should be highly secure. Internet access to system 7000 can be achieved through internet connection segment 740.

Figure 8A:
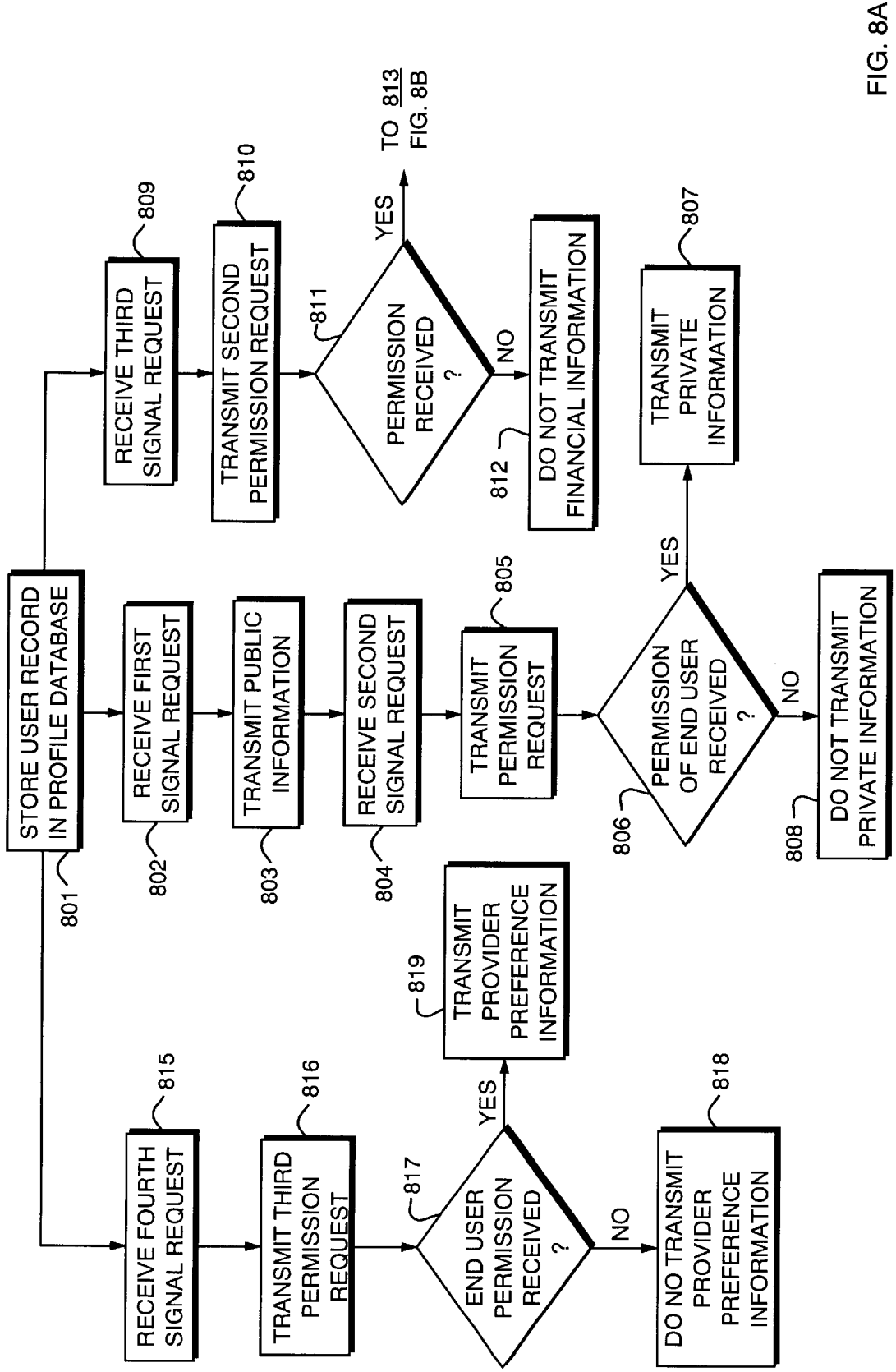
FIGS. 8A–8B are flow charts illustrating a method for storing and selectively sharing end-user information in accordance with a preferred embodiment of the present invention.
Figure 8B:
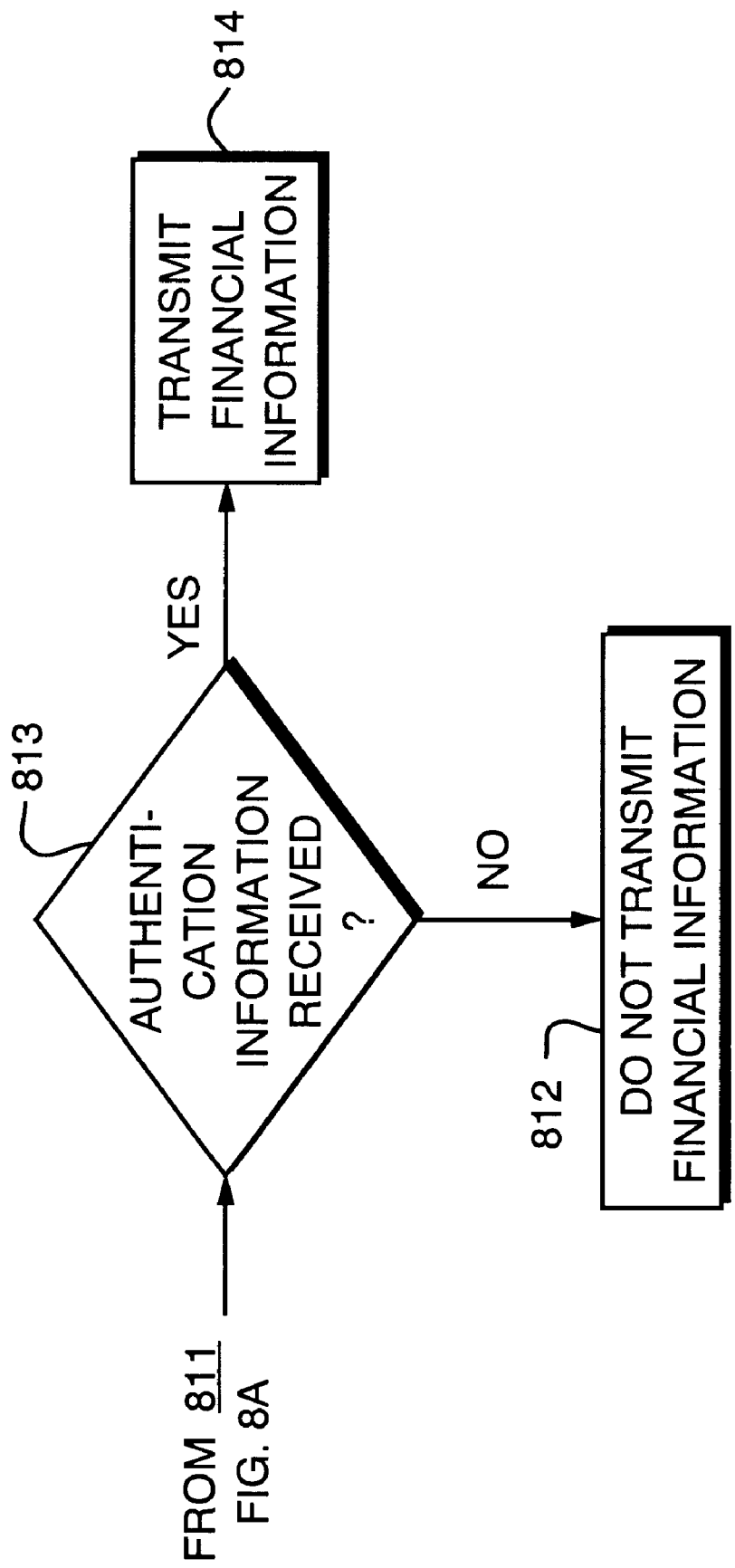

With reference to FIGS. 8A and 8B, a method for storing and selectively sharing end-user information, in a system having a plurality of end-users that remotely access a network having at least a hub site and a plurality of provider sites, is illustrated. In step 801, a user-record corresponding to each end user is stored in a profile database associated with the hub site. Each user-record comprises public information that the end-user submits to the hub site and that the end-user expects will be shared with one or more of the providers without permission of the end-user, private information that the end-user submits to the hub site and that the end-user expects will not be shared with any of the providers without permission of the end-user, and a non-externally identifying symbol associated with the user-record that identifies the end-user on the network. In step 802, a first request signal containing the non-externally identifying symbol corresponding to the end-user is received. In step 803, the public information associated with the end-user is transmitted, in response to the first request signal, from the hub site to a provider without permission of the end-user. In step 804, a second request signal containing the non-externally identifying symbol corresponding to the end-user is received. In step 805, a permission request is transmitted from the hub site to the end-user. In step 806, it is determined if permission of the end-user is received in response to the permission request. If so, in step 807, the private information associated with the end-user is transmitted from the hub site to the provider. If not, in step 808, the private information is not transmitted.

In some embodiments, each user-record further includes financial information associated with the end-user. In this embodiment, in step 809, a third request signal containing the non-externally identifying symbol corresponding to the end-user is received. In step 810, a second permission request is transmitted in response to the third request signal from the hub site to the end user. In step 811, it is determined whether permission of the end-user is received in response to the second permission request. If not, in step 812, the financial information is not transmitted. As shown in FIG. 8B, if permission is received, in step 813, it is determined whether authentication information from the provider is received. If so, in step 814, the financial information associated with the end-user is transmitted from the hub site to the provider. If not, in step 820, the financial information is not transmitted.

In other embodiments, each user-record further includes provider preference information associated with the end-user. As shown in FIG. 8A, in these embodiments, in step 815, a fourth request signal containing the non-externally identifying symbol corresponding to the end-user is received. In step 816, in response to the fourth request signal, a third permission request is transmitted from the hub site to the end user. In step 817, it is determined if permission of the end-user is received in response to the third permission request. If not, in step 818, the provider preference information is not transmitted. If so, in step 819, the provider preference information associated with the end-user is transmitted from the hub site to the provider.

Figure 9:
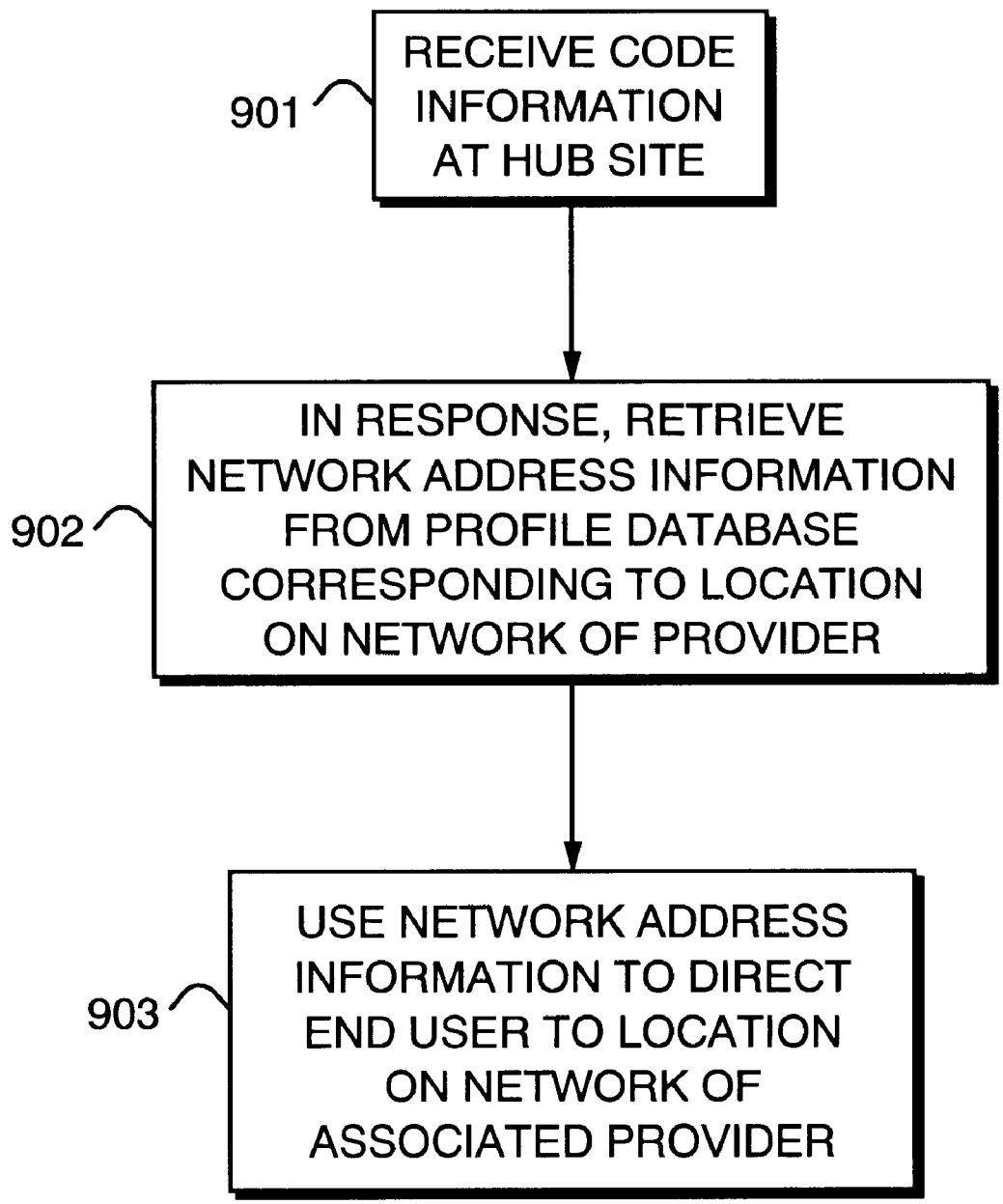
FIG. 9 is a flow chart illustrating a method for identifying, for an end-user, a location on a network of a provider in accordance with a preferred embodiment of the present invention.

With reference to FIG. 9, in a system having a plurality of end-users that remotely access a network having at least a hub site and a plurality of provider sites, a method of identifying for at least one of the end-users a location on the network of at least one of the providers is illustrated. In step 901, code information corresponding to one or more codes (e.g., machine readable codes) provided by the end-user (e.g., by scanning) is received at the hub site. In step 902, in response to the code information, network address information corresponding to the location on the network of a provider that is associated with the received code information is retrieved from a profile database associated with the hub site. In step 903, the network address information is used to direct the end-user to the location on the network of the associated provider. The profile database includes a user-record corresponding to each end user. The user-record includes public information that the end-user submits to the hub site and that the end-user expects will be shared with one or more of the providers without permission of the end-user, private information that the end-user submits to the hub site and that the end-user expects will not be shared with any of the providers without permission of the end-user, and a non-externally identifying symbol associated with the user-record that identifies the end-user on the network.

Figure 10:
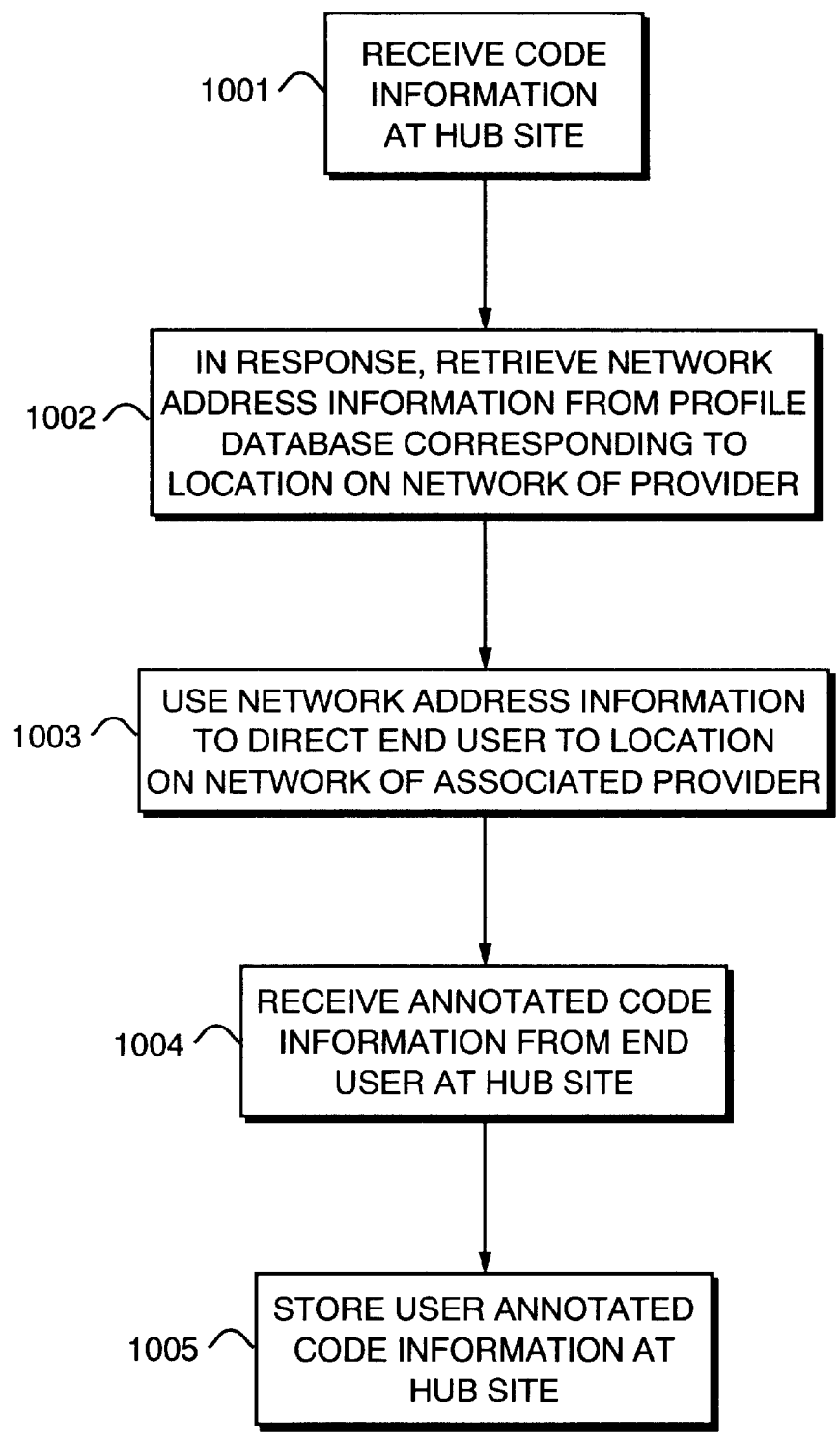
FIG. 10 is a flow chart illustrating a method for identifying, for an end user, a location on a network of a provider and for preserving user-annotated code information in accordance with a preferred embodiment of the present invention.

With reference to FIG. 10, in a system having a plurality of end-users that remotely access a network having at least a hub site and a plurality of provider sites, a method of identifying for at least one of the end-users a location on the network of at least one of the providers and preserving user annotated code information is illustrated. In step 1001, code information corresponding to one or more codes provided by the end-user is received at the hub site. In step 1002, in response to the code information, network address information corresponding to the location on the network of a provider that is associated with the received code information is retrieved from a profile database associated with the hub site. In step 1003, the network address information is used to direct the end-user to the location on the network of the associated provider. In step 1004, user annotated code information is received from the end-user at the hub site. In step 1005, the user annotated code information is stored at the hub site.

Figure 11:
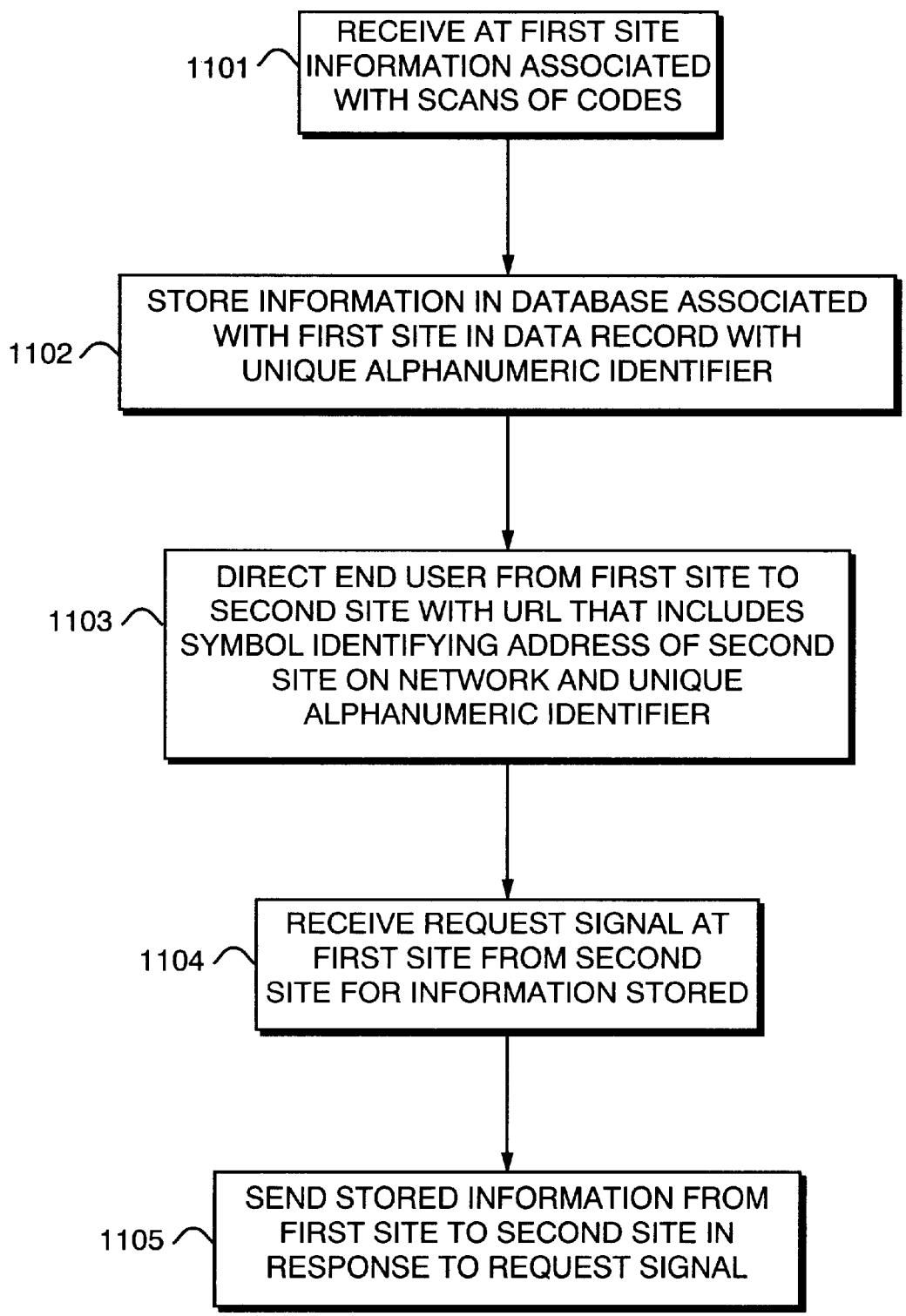
FIG. 11 is a flow chart illustrating a method for transmitting information representative of scanned machine-readable codes between sites in accordance with a preferred embodiment of the present invention.

With reference to FIG. 11, a method for transmitting information representative of scanned machine-readable codes between network sites is illustrated. In step 1101, information associated with one or more scans of machine-readable codes made by an end-user is received at a first site. In step 1102, information associated with the scans is stored at a database associated with the first site in a data record having a unique alpha-numeric identifier associated therewith. In step 1103, the end-user is directed from the first site to a second site with a URL that includes both a symbol identifying an address of the second site on the network and the unique alpha-numeric identifier associated with the information stored at the first site. In step 1104, a request signal is received at the first site from the second site for the information stored at the first site. The request signal includes a representation of the unique alpha-numeric identifier. In step 1105, the stored information is sent from the first site to the second site in response to the request signal.

Figure 12:
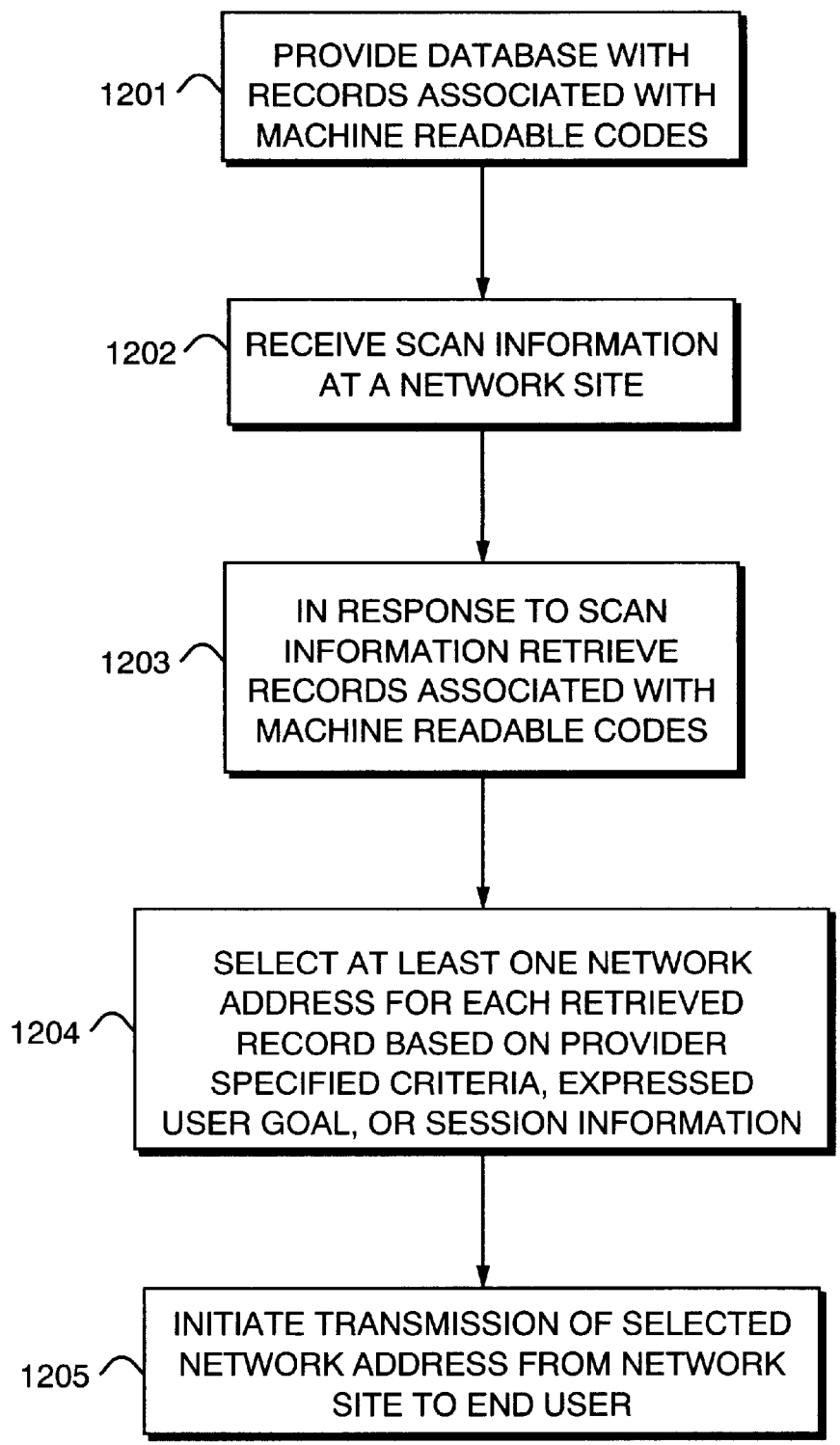
FIG. 12 is a flow chart illustrating a method for directing an end-user to a network location using information corresponding to a provider associated with the end-user in accordance with a preferred embodiment of the present invention.

With reference to FIG. 12, a method for directing an end-user to a network location using information corresponding to a provider associated with the end-user is illustrated. In step 1201, a database is provided. The database includes a plurality of records, each of which is associated with a different machine-readable code, wherein one or more of the records has a plurality of different network addresses associated therewith, the different network addresses being associated with different providers. In step 1202, scan information is received at a network site. The scan information is associated with one or more scans of machine-readable codes made by the end-user with a remote scanning device, the end-user being associated with one of the different providers. In step 1203, in response to the scan information, records associated with the machine-readable codes scanned by the end-user are retrieved from the database. In step 1204, based on criteria specified by the provider associated with the end-user, at least one network address for each of the retrieved records is selected. In other embodiments, the network address is selected based on an expressed goal of the end-user. In still other embodiments, the network address is selected based on property information of a session of the end-user on the network. In step 1205, transmission of the at least one selected network address from the network site to the end-user is initiated.

What is claimed is:

1. A method for transmitting information representative of scanned machine-readable codes between network sites, comprising:

a) receiving, at a first site, information associated with one or more scans of machine-readable codes made by an end-user;

b) storing, at a database associated with the first site, the information associated with one or more scans of machine-readable codes in a data record having a unique alpha-numeric identifier associated therewith;

c) directing the end-user from the first site to a second site with a URL (Uniform Resource Locator) that includes both a symbol identifying an address of the second site on the network and the unique alpha-numeric identifier associated with the information stored at the first site;

d) receiving, at the first site, a request signal from the second site for the information stored at the first site, wherein the request signal includes a representation of the unique alpha-numeric identifier; and e) sending the stored information from the first site to the second site in response to the request signal.

2. A system for transmitting information representative of scanned machine-readable codes between network sites, comprising:

a first site at which information associated with one or more scans of machine-readable codes made by an end-user is received;

a database associated with the first site that stores the information associated with one or more scans of machine-readable codes in a data record having a unique alpha-numeric identifier associated therewith;

a second site to which the end user is directed, from the first site, with a URL (Uniform Resource Locator) that includes both a symbol identifying an address of the second site on the network and the unique alpha-numeric identifier associated with the information stored at the first site;

wherein a request signal is received at the first site from the second site for the information stored at the first site, wherein the request signal includes a representation of the unique alpha-numeric identifier; and wherein the stored information is sent from the first site to the second site in response to the request signal.

* * * * *